US008842139B2

(12) United States Patent
Kanamori

(10) Patent No.: US 8,842,139 B2
(45) Date of Patent: Sep. 23, 2014

(54) DRIVING METHOD FOR DRIVING ELECTROPHORETIC DISPLAY APPARATUS, CONTROL CIRCUIT, AND ELECTROPHORETIC DISPLAY APPARATUS

(75) Inventor: Hiroaki Kanamori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 443 days.

(21) Appl. No.: 13/238,619

(22) Filed: Sep. 21, 2011

(65) Prior Publication Data

US 2012/0098873 A1 Apr. 26, 2012

(30) Foreign Application Priority Data

Oct. 25, 2010 (JP) ................................ 2010-238256

(51) Int. Cl.
*G09G 5/10* (2006.01)
*G02F 1/167* (2006.01)

(52) U.S. Cl.
CPC ..................................... *G02F 1/167* (2013.01)
USPC ............................ 345/690; 345/107; 382/266

(58) Field of Classification Search
CPC .......... G09G 3/344; G09G 5/10; G02F 1/167; G06T 5/001
USPC .......................... 345/107, 204, 690; 382/266
See application file for complete search history.

(56) References Cited

U.S. PATENT DOCUMENTS

| | | | | |
|---|---|---|---|---|
| 6,650,462 | B2 | 11/2003 | Katase | |
| 2008/0068660 | A1* | 3/2008 | Loce et al. | 358/3.06 |
| 2008/0273799 | A1* | 11/2008 | Kimura | 382/200 |
| 2009/0231454 | A1* | 9/2009 | Miura | 348/220.1 |
| 2010/0232707 | A1* | 9/2010 | Kato et al. | 382/199 |
| 2011/0216055 | A1* | 9/2011 | Chiu et al. | 345/212 |

FOREIGN PATENT DOCUMENTS

| | | |
|---|---|---|
| JP | A-2002-116733 | 4/2002 |
| JP | A-2010-181618 | 8/2010 |

* cited by examiner

*Primary Examiner* — Lixi C Simpson
(74) *Attorney, Agent, or Firm* — Oliff PLC

(57) ABSTRACT

A driving method for driving an electrophoretic display apparatus includes writing first image data into a display unit provided with a plurality of pixels; creating second image data including image data which corresponds to first contour pixels, and which is extracted from the first image data, each of the first contour pixels being a first pixel located adjacent to a second pixel having a gray-scale level different from a gray-scale level of the first pixel, the first pixel and the second pixel being included in the plurality of pixels; and writing the second image data into the display unit.

15 Claims, 14 Drawing Sheets

EXAMPLE OF FIRST IMAGE DATA (14×17 dots)

DIAGRAM FOR DESCRIPTION OF FIRST CONTOUR PIXEL (3×3 dots)

SECOND IMAGE DATA CORRESPONDING TO FIRST IMAGE DATA SHOWN IN FIG. 4A (14×17 dots)

EXAMPLE OF FIRST IMAGE DATA (14×17 dots)

DIAGRAM FOR DESCRIPTION OF SECOND CONTOUR PIXEL (3×3 dots)

THIRD IMAGE DATA CORRESPONDING TO FIRST IMAGE DATA SHOWN IN FIG. 8A (14×17 dots)

Y(+)
X(+)

Y(+)
X(+)

PIXEL j
PIXEL i
PIXEL m
PIXEL k
Y(+)
X(+)

Y(+)
X(+)

THIRD IMAGE DATA
(RESULT OF EXTRACTION OF SECOND CONTOUR PIXEL)

SECOND IMAGE DATA
(RESULT OF EXTRACTION OF FIRST CONTOUR PIXEL)

FIRST IMAGE DATA
(DESIRED GRAY-SCALE LEVEL)

DRIVING METHOD FOR DRIVING ELECTROPHORETIC DISPLAY APPARATUS, CONTROL CIRCUIT, AND ELECTROPHORETIC DISPLAY APPARATUS

BACKGROUND

1. Technical Field

The present invention relates to a driving method for driving an electrophoretic display apparatus, a control circuit for executing the driving method, and an electrophoretic display apparatus.

2. Related Art

Well-known examples of reflective devices functioning as a tool for allowing users thereof to read characters displayed thereon include electronic paper displays. Such an electronic paper display is provided with a memory-type display system and has a characteristic of consuming electricity only when updating display content, but consuming the least amount of electricity while retaining the updated display content after the update.

Known examples of such a memory-type display system of this electronic paper display include electrophoretic display systems which have become most popular in recent years. Such an electrophoretic display system has electrophoretic elements each provided therein with microcapsules each encapsulating therein electrically-charged black or white particles, and has a plurality pairs of electrodes, each pair consisting of two electrodes which are located above and below a corresponding electrophoretic element, respectively. This electrophoretic display system causes each pair of the electrodes to be subjected an electric-potential difference therebetween and attract the black-color particles and the white-color particles, and displays a relevant image by configuring aggregates of the black-color particles and aggregates of the white-color particles.

To date, an active matrix method utilizing thin film transistors (TFTs) has been employed as one of driving circuits for driving such an electrophoretic display system.

A driving method according to JP-A-2002-116733 causes an electrophoretic display apparatus to display relevant images by supplying electrophoretic elements, which correspond to respective pixels implemented in relation to the active matrix method, with corresponding voltages during a period of time in accordance with gray-scale values indicated by image data.

However, such an existing driving method for driving an electrophoretic display apparatus has a disadvantage in that, some of pixels having been supplied with corresponding voltages during the same period of time result in displaying an image with variations of gray-scale levels because of influences from surrounding pixels.

Specifically, in an existing driving method, as shown in FIG. 15A, among three juxtaposed pixels 20*a*, 20*b* and 20*c*, focusing the centrally-positioned pixel 20*b* (an pixel electrode 22*b*) which is supplied with a blackening voltage ($V_H$), a desired black-color gray-scale level is assured because the pixel electrodes 22*a* and 22*c*, which are located at left and right sides adjacent to the pixel electrode 22*b*, respectively, are supplied with the same voltage $V_H$, and thus, no leakage of unwanted electric fields arises. In addition, a diagram in an upper portion of FIG. 15A is a plan view resulting from viewing the three juxtaposed pixels from a front side, and a diagram in a lower portion thereof is a side cross-sectional view of the three pixels.

On the other hand, as shown in FIG. 15B, the pixel electrodes 22*a* and 22*c*, which are located at left and right sides adjacent to the centrally-positioned pixel 20*b* (an pixel electrode 22*b*) supplied with a blackening voltage ($V_H$), are supplied with a voltage having a reverse polarity ($V_L$: for example, a whitening voltage). In this case, as shown in a side cross-sectional view in a lower portion of FIG. 15B, an electric potential arising between the adjacent electrodes 22*a* and the electrode 22*b* and another electric potential arising between the adjacent electrode 22*c* and the electrode 22*b* cause electric fields (denoted by outline arrows) at portions bordering the adjacent pixel electrode 22*a* and the adjacent electrode 22*c*, respectively, so that white-color electrically-charged particles 27 are partially moved to the display side, and the centrally-positioned pixel 20*b* results in displaying an image having slightly whitened black-color gray-scale level compared with a desired black-color gray-scale level.

This phenomenon is considered to be due to existence of pixels which are located at positions surrounding a certain pixel naturally expected to have a desired black-color gray-scale level, and which have gray-scale levels different from the gray-scale level of the certain pixel.

That is, existing driving methods for driving an electrophoretic display apparatus have a disadvantage in that it is difficult to achieve desired display quality.

SUMMARY

An advantage of some aspects of the invention is to provide a driving method for driving an electrophoretic display apparatus, a control circuit and an electrophoretic display apparatus which enable achievement of high display quality, as will be described in the following application examples and embodiments.

Application Example 1

A driving method for driving an electrophoretic display apparatus, according to this application example 1, includes writing first image data into a display unit provided with a plurality of pixels; creating second image data including image data which corresponds to first contour pixels, and which is extracted from the first image data, each of the first contour pixels being a first pixel located adjacent to a second pixel having a gray-scale level different from a gray-scale level of the first pixel, the first pixel and the second pixel being included in the plurality of pixels; and writing the second image data into the display unit.

According to this application example 1, it is possible to, after having written the first image data, supply correction voltages to the first contour pixels to allow the first contour pixels to achieve corresponding desired gray-scale levels by writing the second image data, each of the first contour pixels having not been updated to a desired gray-scale level because of an influence from a pixel adjacent to the each of the first contour pixels.

As a result, desired gray-scale levels can be realized all over the screen of display unit, and thus, it is possible to provide an electrophoretic display apparatus which enables achievement of high-quality display.

Application Example 2

A driving method for driving an electrophoretic display apparatus, according to this application example 2, includes writing first image data into a display unit provided with a plurality of pixels; creating third image data including image data which corresponds to second contour pixels, and which is extracted from the first image data, each of the second contour pixels being a third pixel which is enclosed by eight of fourth pixels including at least three pixels each having a gray-scale level different from a gray-scale level of the third pixel, the third pixel and the fourth pixel being included in the plurality of pixels; and writing the third image data into the display unit.

According to this application example 2, it is possible to, after having written the first image data, supply correction voltages to the second contour pixels to achieve desired gray-scale levels by writing the third image data, each of the second contour pixels having not been updated to a desired gray-scale level because of influences from three or more of pixels enclosing the second pixel.

As a result, since it is possible to achieve desired gray-scale levels all over the screen of display unit, it is possible to provide an electrophoretic display apparatus which enables display of high-quality images.

Moreover, a certain pixel is not extracted as the second contour pixel when the certain pixel is located adjacent to four pixels including at least one pixel having a gray-scale level different from that of the certain pixel, but the certain pixel is extracted as the second contour pixel, the first time the certain pixel satisfies a condition in which the certain pixel is contacted with eight pixels which include four pixels oblique to the certain pixel, and which include at least three pixels each having a gray-scale level different from that of the certain pixel. Therefore, in general, the number of the second contour pixels, which are extracted from the first image data, becomes less than the number of the first contour pixels. Accordingly, the number of pixels which are supplied with correction voltages become less, and according to this application example 2, it is possible to realize an electrophoretic display apparatus which consumes electric power less than an electrophoretic display apparatus according to the application example 1.

Further, as a result of experiments performed by the inventors and the like, it has been figured out that, in this application example as well, it is possible to achieve desired gray-scale levels all over the screen of the display unit, and provide an electrophoretic display apparatus which enables display of sufficiently high-quality images.

Application Example 3

A driving method for driving an electrophoretic display apparatus, according to this application example 3, includes writing first image data into a display unit provided with a plurality of pixels; creating second image data including image data which corresponds to first contour pixels, and which is extracted from the first image data, each of the first contour pixels being a first pixel located adjacent to a second pixel having a gray-scale level different from a gray-scale level of the first pixel, the first pixel and the second pixel being included in the plurality of pixels; creating third image data including image data which corresponds to second contour pixels, and which is extracted from the first image data, each of the second contour pixels being a third pixel which is enclosed by eight of fourth pixels including at least three pixels each having a gray-scale level different from a gray-scale level of the third pixel, the third pixel and the fourth pixel being included in the plurality of pixels; writing the second image data into the display unit; and writing the third image data into display unit.

According to this application example 3, it is possible to, after having written the first image data, supply correction voltages to the first contour pixels and the second contour pixels to achieve desired gray-scale levels by writing the second image data and the third image data, respectively, each of the first and second contour pixels having not been updated to a desired gray-scale level because of an influence from a pixel adjacent to the first pixel or influences from three or more of pixels enclosing the second pixel.

As a result, since it is possible to achieve desired gray-scale levels all over the screen of display unit, it is possible to provide an electrophoretic display apparatus which enables display of high-quality images.

Moreover, it is possible to, by using the second image data, and the third image data, which has less pixels to be supplied with correction voltages than the second image data, reduce power consumption to a more degree than in the case where corrections of gray-scale levels are made by performing correction-voltage supply process based on the second image data only twice.

Furthermore, a first process of allowing individual pixels to be supplied with corresponding voltages on the basis of the second image data resulting from extracting image data corresponding to all of pixels to be affected by one of surrounding pixels, and a second process of allowing the pixels to be supplied with corresponding voltages on the basis of the third image data resulting from extracting image data corresponding to pixels which are likely to be affected by some ones of surrounding pixels, make it possible to perform weighting of gray-scale levels in accordance with degrees of influences from surrounding pixels, and thus, enable further improvement of display quality.

Application Example 4

In the driving method for driving an electrophoretic display apparatus, according to the application example 1, in the case where the first image data is image data having u gray-scale levels, as described in this application example 4, preferably, the number of to-be-created blocks of the second image data is larger than or equal to $(u-1)$ and smaller than or equal to $u\times(u-1)/2$.

According to this application example 4, in the case where the first image data is image data having u gray-scale levels, by creating a plurality blocks of the second image data, and writing the plurality blocks of the second image data on a block-by-block basis, correction voltages can be supplied at plural times, and thus, it is possible to perform control of gray-scale levels in more detail.

Application Example 5

In the driving method for driving an electrophoretic display apparatus, according to the application example 4, in the case where the number of to-be-created blocks of the second image data is a plural number, as described in this application example 5, preferably, the plurality of blocks of the second image data is written into the plurality of pixels included in the display unit on a block-by-block basis.

Application Example 6

A control circuit included in an electrophoretic display apparatus, according to this application example 6, is configured to carry out the driving method according to any one of the above-described application examples 1 to 5, to drive the display unit to perform displaying.

Application Example 7

An electrophoretic display apparatus according to this application example 7 includes the control circuit according to the above-described application example 6.

An electrophoretic display apparatus according to this application example 7, which includes a control circuit configured to carry out the above-described driving method, enable supply of correction voltages to pixels having not been updated to desired gray-scale levels because of influences from surrounding pixels.

As a result, it is possible to achieve desired gray-scale levels all over the screen of the display unit, and thus, it is possible to provide an electrophoretic apparatus which enables display of high-quality images.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described with reference to drawings. In addition, in each of the drawings, scale ratios for individual layers and members are made different from real scale ratios therefor so that the sizes of the individual layers and members can be recognizably large.

Embodiment 1

Outline of Electrophoretic Display Apparatus

Firstly, the entire configuration (i.e., outline) of an electrophoretic display apparatus according to this embodiment 1 will be described with reference to FIGS. 1 and 2.

Figure 1:
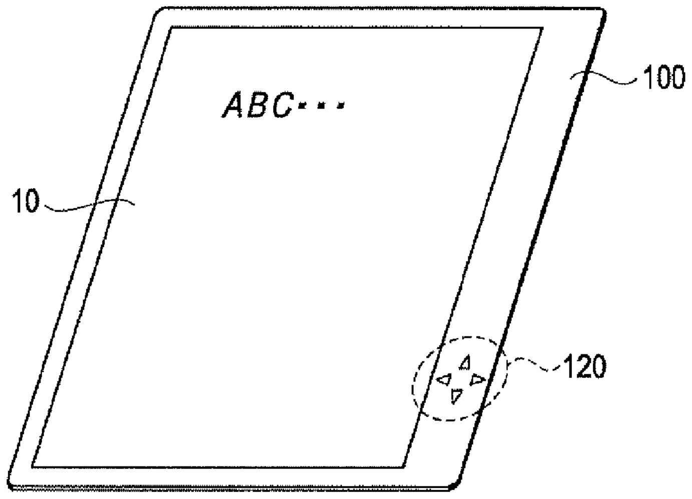
FIG. 1 is a perspective view of an electrophoretic display apparatus according to an embodiment 1 of the invention.

Referring to FIG. 1 which is a perspective view of an electrophoretic display apparatus according to this embodiment 1, an electrophoretic display apparatus 100 according to this embodiment includes a display unit 10 for performing a display process using electrophoretic elements, and an operation unit 120 serving as an interface with operations for the electrophoretic display apparatus.

Details will be described hereinafter, but this electrophoretic display apparatus 100 enables provision of more distinct images than any of existing electrophoretic display apparatuses by employing a driving method which allows pixels, for each of which a lowering of contrast is anticipated, to be overwritten with second image data for enhancing the contrast when updating a display.

Basic Configuration of Electrophoretic Display Apparatus

Figure 2:
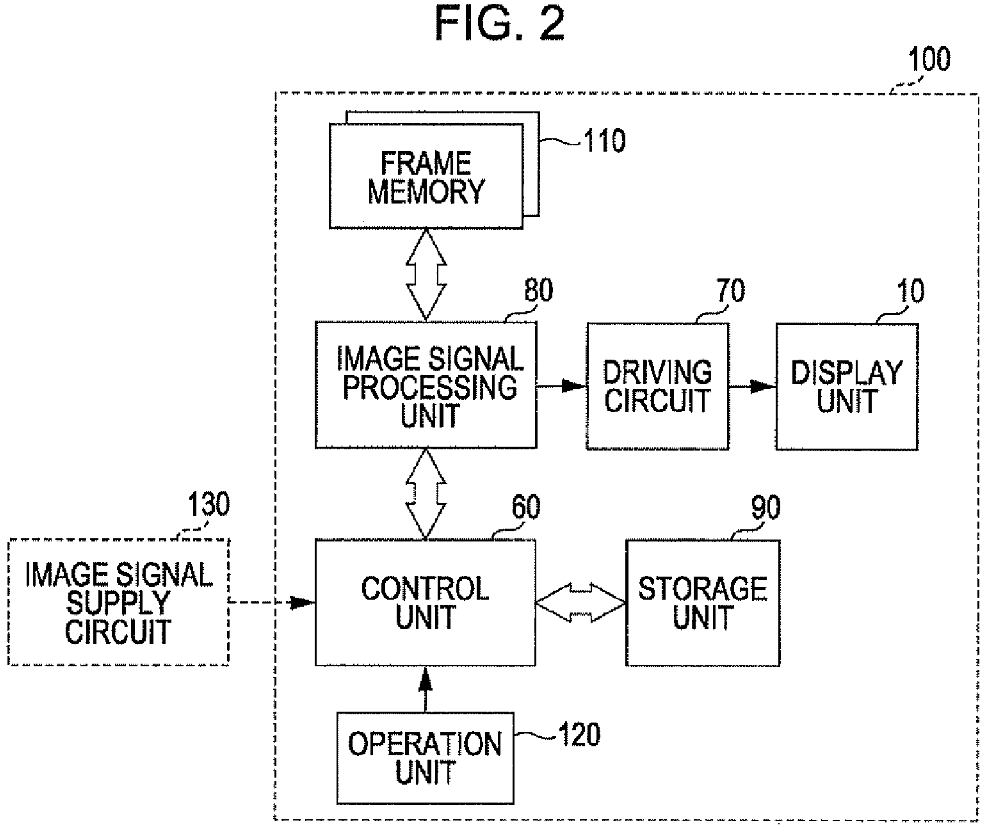
FIG. 2 is a block diagram illustrating each of blocks included in an electrophoretic apparatus according to an embodiment 1 of the invention.

Referring to FIG. 2, which is a block diagram illustrating each of function blocks included in an electrophoretic apparatus according to this embodiment, the electrophoretic apparatus 100 includes the display unit 10, a driving circuit 70 for applying voltages to the display unit 10, an image signal processing unit 80 for supplying image signals to the driving circuit 70, a control unit 60 for performing control of the above-described units, a storage unit 90 for storing image data therein, on the basis of which images are displayed on the display unit 10, a frame memory 110, the operation unit 120, with which users operate the electrophoretic display apparatus 100, and the like.

In addition, a control circuit in this embodiment is configured by, as a preferable example, the control unit 60, the storage unit 90, the image processing unit 80, and the frame memory unit 110. Further, the control circuit may further include the driving circuit 70, the operation unit 120 and the like. Moreover, a configuration of the control circuit is not limited to the configuration described above, but, any circuit configuration which enables realization of a driving method according to this embodiment may be employed.

The control unit 60 is a central processing unit (CPU) which performs control of operations of individual units. Further, the storage unit 90 is attached to the control unit 60.

The storage unit 90 is configured by non-volatile memory modules, such as flash memory modules. The storage unit 90 stores therein first image data, on the basis of which images are displayed on the display unit 10. The storage unit 90 also stores therein a program for defining processes of creating second image data including image data, corresponding to first contour pixels, and having been extracted from the first image data, the first contour pixel being a certain pixel adjacent to any pixel having a gray-scale level different that of the certain pixel. Further, the storage unit 90 stores therein a driving program for defining an order and processes of writing the first image data and the second image data into the display unit, and the like. In addition, details of the first image data and the second image data will be described hereinafter.

The image signal processing unit 80 supplies the driving circuit 70 with image signals in accordance with image data stored in the storage unit 90. In addition, the image data is not limited to the image data stored in the storage unit 90, but may be, for example, image data inputted from an image signal supply circuit 130 which is provided outside the electrophoretic display apparatus 100.

Further, the image signal processing unit 80 has a frame memory 110 attached thereto.

The frame memory 110 is a video random access memory (VRAM) of storage capacity (resolution) sufficient to store therein image data having a memory capacity equivalent to the size of image data corresponding to at least one screen of image data regarding the display unit 10 (i.e., at least one frame of image data regarding the display unit 10). In addition, preferably, the memory capacity is equivalent to two or more frames (screens) of image data.

Further, the image signal processing unit 80 creates the second image data from the first image data in accordance with control signals from the control unit 60 by utilizing the frame memory 110.

Moreover, the image signal processing unit 80 supplies the driving circuit 70 with image signals in accordance with the two kinds of image data.

The operation unit 120 is configured to include a plurality of operation buttons (refer to FIG. 1), and allows users to supply the electrophoretic display apparatus 100 with trigger signals for switching displays.

Figure 3B:
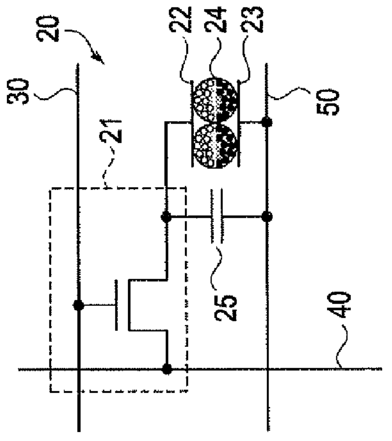
FIG. 3B is an equivalent circuit illustrating an electrical configuration of a pixel according to an embodiment 1 of the invention.
Figure 3A:
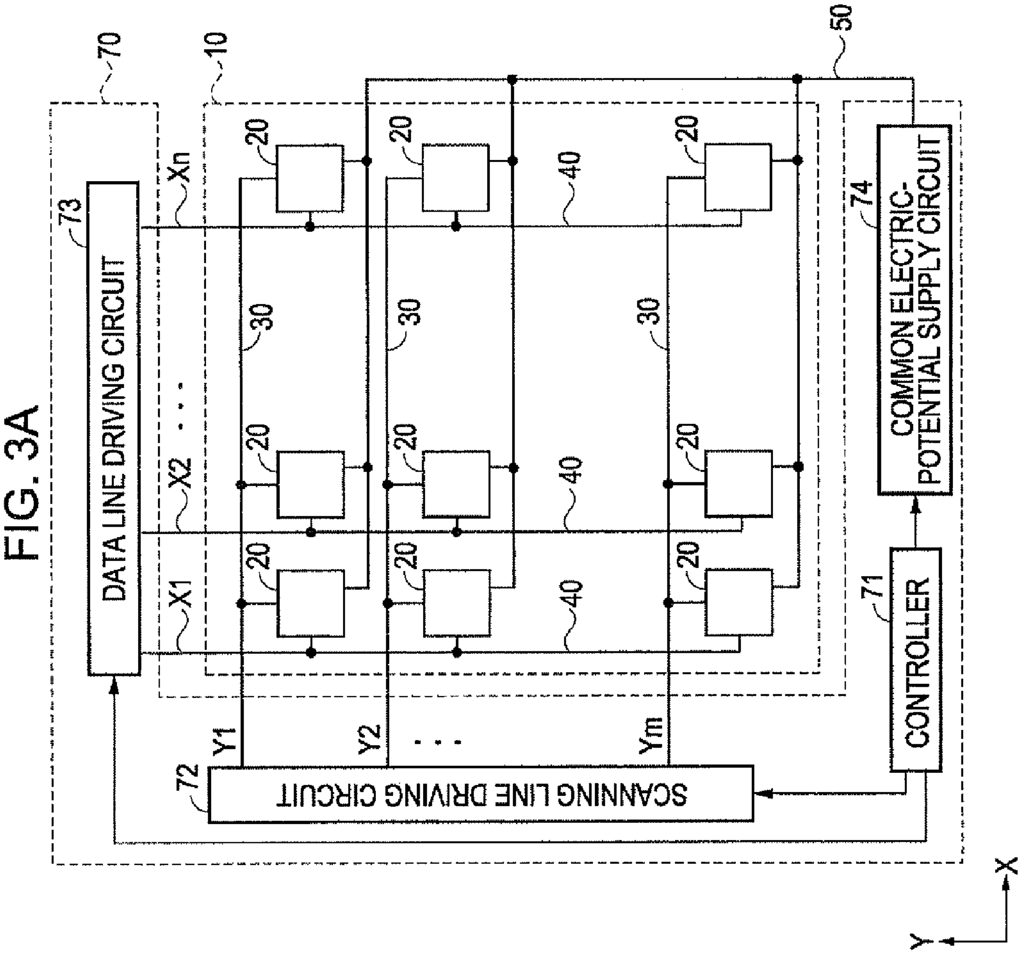
FIG. 3A is a block diagram illustrating a configuration of a display unit and a driving circuit of an electrophoretic apparatus according to an embodiment 1 of the invention.

FIG. 3A is a block diagram illustrating a configuration of the display unit 10 and the driving circuit 70 of the electrophoretic apparatus 100 according to this embodiment, and FIG. 3B is an equivalent circuit illustrating an electrical configuration of a pixel, according to this embodiment.

Next, configurations of the display unit 10 and the driving circuit 70 of the electrophoretic display apparatus 100 according to this embodiment will be described with reference to FIGS. 3A and 3B.

The display unit 10 has pixels 20 of m rows and n columns, which are arrayed in a matrix shape (i.e., in a two-dimensional plane). Further, in the display unit 10, m scanning lines 30 (i.e., scanning lines Y1, Y2, . . . , Ym) and n data lines 40 (i.e., data lines X1, X2, . . . , Xn) are provided so as to intersect with one another. Specifically, the m scanning lines 30 extend in a row direction (i.e., in an x-axis direction) and the n data lines 40 extend in a column direction (i.e., in a y-axis direction). The pixels 20 are disposed at positions corresponding to intersection points of the m scanning lines 30 and the n data lines 40.

Further, the driving circuit 70 is interfaced with the display unit 10.

The driving circuit 70 is configured by a controller 71, a scanning line driving circuit 72, a data line driving circuit 73, a common electric potential supply circuit 74, and the like.

The controller 71 performs control of operations of the scanning line driving circuit 72, the data line driving circuit 73 and the common electric potential circuit 74. The controller 71 supplies, for example, timing signals, such as clock signals and start pulses, to the individual circuits.

The scanning line driving circuit 72 sequentially supplies pulse-shaped scan signals to the scanning lines Y1, Y2, Ym on the basis of timing signals supplied from the controller 71.

The data line driving circuit 73 supplies image signals to the data lines X1, X2, . . . , Xn on the basis of timing signals supplied from the controller 71. Each of the image signals has three kinds of values of electric potential, a first one being a high electric potential $V_H$ (for example, 15V), a second one being a middle electric potential $V_M$ (for example, 0V), a third one being a low electric potential $V_L$ (for example, −15V). In addition, in this embodiment, image signals each having the low electric potential $V_L$ are supplied to the pixels 20 required to display white color; while image signals each having the high electric potential $V_H$ are supplied to the pixels 20 required to display black color.

The common electric potential supply circuit 74 supplies a common electric potential line 50 with a common electric potential Vcom. In addition, the value of the common electric potential Vcom may be a constant value of electric potential, or may be changed to a value of electric potential in accordance with, for example, a gray-scale level corresponding to a piece of to-be-written image data.

In this embodiment, as will be described hereinafter, the pixels 20 are each supplied with the same electric potential as the common electric potential Vcom. This configuration may be realized by, for example, making the common electric potential Vcom, which is outputted from the common electric potential supply circuit 74, be the same as the high electric potential $V_H$ or the low electric potential $V_L$. Alternatively, the configuration may be realized by causing the data line driving circuit 73 to supply another electric potential the same as the common electric potential Vcom, in addition to the high electric potential $V_H$ and the low electric potential $V_L$.

In addition, various signals are inputted and outputted to/from the controller 71, the scanning line driving circuit 72, the data line driving circuits 73, and the common electric potential supply circuit 74, but, signals which are not essentially associated with this embodiment will be omitted from description.

Refereeing to FIG. 3B, the pixel 20 includes a pixel-switching transistor 21, a pixel electrode 22, a common electrode 23, an electrophoretic element 24, and a storage capacitor 25.

The pixel-switching transistor 21 is configured by, for example, an N type transistor. The pixel-switching transistor 21 has a gate electrode electrically connected to one of the scanning lines 30, a source electrode electrically connected to one of the data lines 40, and a drain electrode electrically connected to one end of the pixel electrode 20 and one end of the storage capacitor 25.

The pixel-switching transistor 21 outputs image signals supplied from the data line driving circuit 73 via one of the data lines 40 to the pixel electrode 22 and the storage capacitor 25 at timings in synchronization with those of pulse-like portions of the scanning signals.

The pixel electrode 22 is supplied with image signals from the data line driving circuit 73 via one of the data lines 40 and the pixel-switching transistor 21. The pixel electrode 22 is disposed so as to be opposite the common electrode 23 via the electrophoretic element 24.

The common electrode 23 is electrically connected to the common electric potential line 50 supplied with the common electric potential Vcom.

The electrophoretic element 24 is configured by a plurality of capsules each including electrophoretic particles. It is assumed in this embodiment that, for example, black-color particles are positively charged and white-color particles are negatively charged.

The storage capacitor 25 is formed of a pair of electrodes which are located opposite each other and which includes a dielectric film interposed therebetween, one electrode (one end) being electrically connected to the pixel electrode 22 and the pixel-switching transistor 21, the other electrode (the other end) being electrically connected to the common electric potential line 50. The storage capacitor 25 is capable of retaining an image signal during a constant period of time.

Driving Method for Driving Electrophoretic Display Apparatus

Figure 4A:
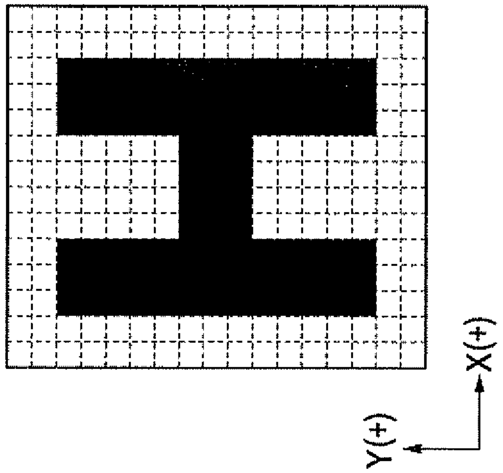
FIG. 4A is a diagram illustrating an example of first image data according to an embodiment 1 of the invention.
Figure 4B:
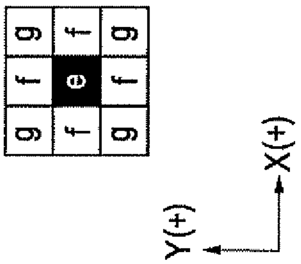
FIG. 4B is a diagram illustrating a first contour pixel according to an embodiment 1 of the invention.
Figure 4C:
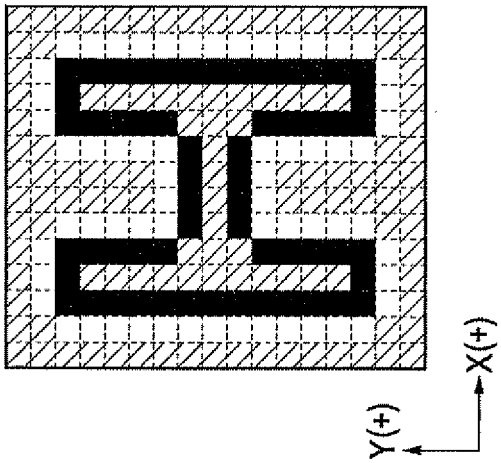
FIG. 4C is a diagram illustrating an example of second image data corresponding to first image data, according to an embodiment 1 of the invention.

FIG. 4A is a diagram illustrating an example of first image data according to this embodiment, FIG. 4B is a diagram illustrating a first contour pixel according to this embodiment, and FIG. 4C is a diagram illustrating an example of second image data corresponding to the first image data, according to this embodiment.

Next, a driving method for driving an electrophoretic apparatus, according to this embodiment, will be described hereinafter.

First, with reference to FIGS. 4A to 4C, first image data, a first contour pixel and second image data for the driving method according to this embodiment will be described. In addition, in each of the following related figures, a position of a pixel e, which is located at the center of FIG. 4B, is assumed to be a central position. Further, an x-axis (+) side direction relative to the central position is defined to be a right-side direction; while an x-axis (−) side direction relative to the central position is defined to be a left-side direction, and a y-axis (+) side direction relative to the central position is defined to be an above-side direction; while an y-axis (−) side direction relative to the central position is defined to be a below-side direction. Hereinafter, under such a condition, description will be made.

The first image data is image data corresponding to an image which is desired to be finally displayed on the electrophoretic display apparatus 100 according to this embodiment by users. Image data shown in FIG. 4A is an example of the first image data, which corresponds to a character image "H" drawn in black color on a white-color background of 14×17 dots. Hereinafter, description will be made by way of this image (image data). In addition, rectangles forming the image data shown in FIG. 4A correspond to respective pixels, and in this embodiment, each pixel has one of two gray-scale levels which correspond to black color and white, respectively.

The second image data is image data resulting from extracting first contour-pixel image data from the first image data, each piece of the first contour-pixel image data being a piece of certain pixel image data which is located adjacent to a piece of pixel image data having a gray-scale level different from that of the piece of certain pixel image data. The first contour pixel will be described below by employing, for example, the pixel e located at the center of an image of 3×3 dots shown in FIG. 4B.

Here, the pixel e is determined to be one of the first contour pixels, in the case where at least one of four pixels f, which are located adjacent to the pixel e in the above-side, below side, left-side and right-side directions, respectively, has a gray-scale level different from that of the pixel e. In addition, in this case, it is to be noted that respective gray-scale levels of four pixels g, which are located oblique to the pixel e, are not involved in the determination as to whether the pixel e is one of the first contour pixels, or not.

For example, as shown in FIG. 43, since the pixel e displays black color, and all of four pixels f, which are located adjacent to the pixel e in the above-side, below side, left-side and right-side directions, respectively, display white color, that is, since at least one of four pixels, which are located adjacent to the pixel e in the above-side, below side, left-side and right-side directions, respectively, has a gray-scale level different from that of the pixel e, the pixel e is one of black-color first contour pixels. Further, in this case, the four pixels f are white-color first contour pixels, and descriptions of this determination will be hereinafter made in detail.

FIG. 4C is a diagram illustrating second image data resulting from extracting image data corresponding to first contour pixels from the first image data shown in FIG. 4A.

First, in FIG. 4C, the first contour pixels include black-color pixels forming the outline (contour) of the character "H" and white-color pixels located immediately outside the black-color pixels. The pixels shown by hatching are pixels not corresponding to the first contour pixels.

Specifically, each of black-color pixels forming the outline (contour) of the character "H" has at least one pixel having a gray-scale level different from that of the each of black-color pixels among four adjacent pixels which are located in the above-side, below side, left-side and right-side directions relative to the each of black-color pixels, respectively, and therefore, the each of black-color pixels is a black-color first contour pixel.

Moreover, each of white-color pixels located immediately outside the black-color first contour pixels has also at least one pixel having a gray-scale level different from that of the each of white-color pixels (that is, the at least one pixel is a black-color first contour pixel) among four adjacent pixels which are located in the above-side, below side, left-side and right-side directions relative to the each of white-color pixels, respectively, and therefore, the each of white-color pixels is a white-color first contour pixel.

Further, the black-color first contour pixels are supplied with driving electric potentials (voltages) for causing them to display black color; while the white-color first contour pixels are supplied with driving electric potentials for causing them to display white color, and the other pixels shown by hatching are supplied with the same electric potential as that of the common electrode.

The second image data denotes pieces of image data each defining one of these driving electric potentials allocated thereto.

Figure 5:
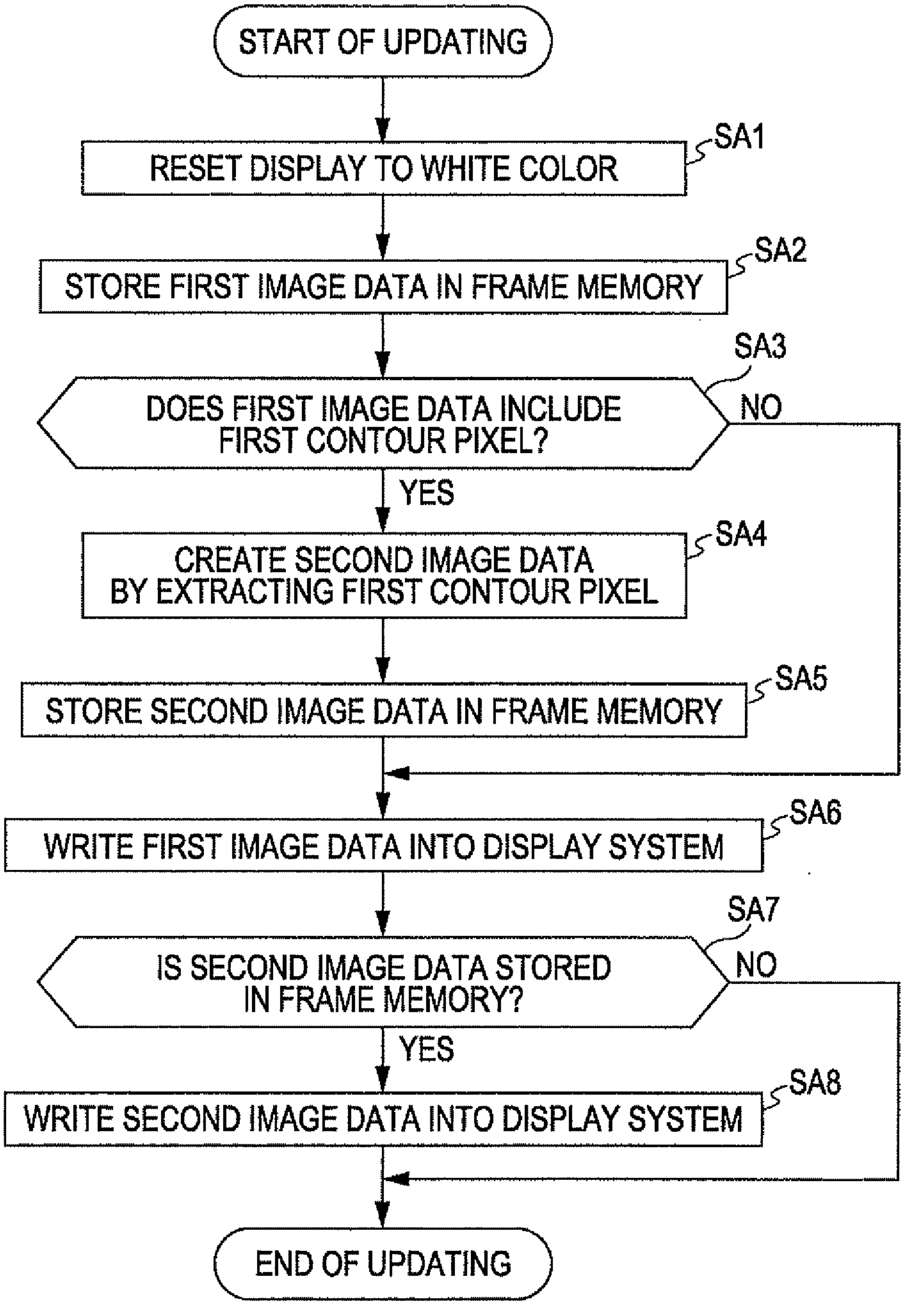
FIG. 5 is a flowchart illustrating a process flow of a driving method according to an embodiment 1 of the invention.

FIG. 5 is a flowchart illustrating a process flow of a driving method according to this embodiment. FIGS. 6A to 6D are state transition diagrams according to this embodiment.

Figures 6A, 6B, 6C, 6D:
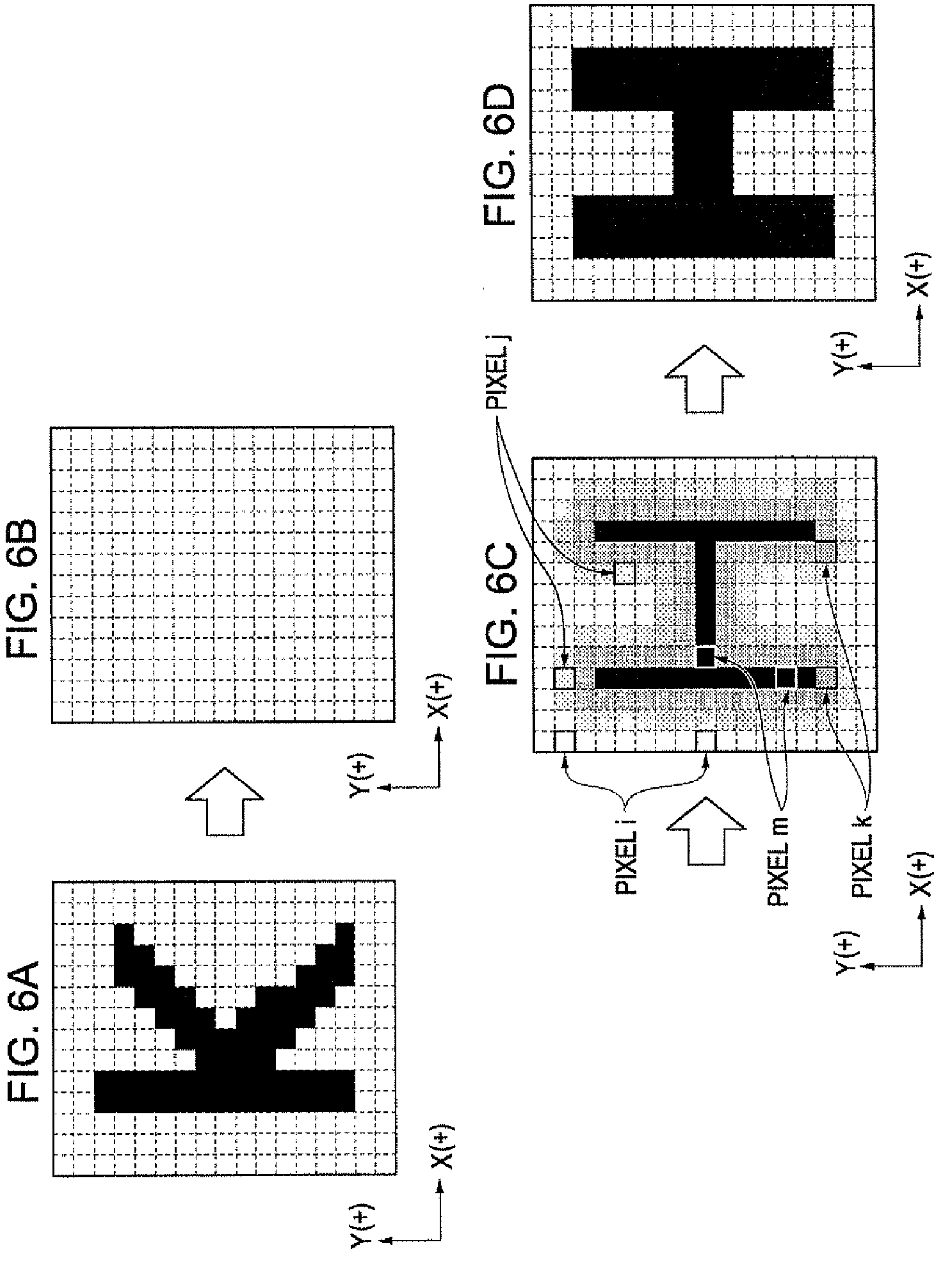
FIGS. 6A to 6D are state transition diagrams of an image display, according to an embodiment 1 of the invention.

Here, a driving method for driving an electrophoretic display apparatus according to this embodiment will be described with reference to FIGS. 5 and 6A to 6D. Specifically, as an example, a driving method for updating a character "K" in an initial state, such as shown in FIG. 6A, to a character "H" shown in FIG. 6D will be described hereinafter.

In addition, the following operations are performed such that the above-described control unit 60 shown in FIG. 2 performs control so as to cause individual units including the image signal processing unit 80 to execute relevant processes while executing driving programs stored in the storage unit 90.

In step SA1, a voltage supply process is performed so as to cause all pixels corresponding to the entire screen of the display unit 10 to display white color. In other words, all pixels corresponding to the entire screen are reset to white-color display states. As a result of this operation, an initial-state display "K" shown in FIG. 6A is reset, and the entire screen is in the white-color display state shown in FIG. 6B.

In step SA2, first image data corresponding to an image to be displayed on the screen of the display unit 10 is stored in the frame memory 110 (that is, is written into the frame memory 110).

In step SA3, it is determined whether the first image data includes one or more first contour pixels, or not. Specifically, it is determined by evaluating the first image data whether one or more first contour pixels, each of which is a certain pixel located adjacent to a pixel having a gray-scale level different from that of the certain pixel, are included in pixels corresponding to the first image data, or not. If it is determined that one or more first contour pixels are included in pixels corresponding to the first image data, the process flow proceeds to step SA4. Otherwise, the process flow jumps to step SA6.

In step SA4, second image data resulting from extracting image data corresponding to the first contour pixels from the first image data is created.

In step SA5, the second image data is stored in the frame memory 110.

In step SA6, the first image data is written into the display unit 10. As a result of this operation, as shown in FIG. 6C, image data for the character "H" is written, but, as shown in faint gray color, with respect to pixels each bordering a pixel which has a gray-scale level different from the each pixel, the desired gray-scale levels are not obtained because of influences from surrounding pixels.

For example, pixels j, which are located immediately outside the black-color pixels forming the character "H", are pixels required to display a color corresponding to a white-color gray-scale level, but, currently, are pixels each displaying a color corresponding to a slightly blackened white-color gray-scale level (i.e., a faint-gray-color gray-scale level), compared with the desired white-color gray-scale level, because of influences from adjacent black-color pixels. As a result, each of the pixels j has a gray-scale level different from that of each of pixels i, which is located immediately outside the pixels j with no influence from surrounding pixels, and which displays a color corresponding to the desired while-color gray-scale level.

Meanwhile, pixels k forming a contour of the character "H" are pixels required to display a color corresponding to a black-color gray-scale level, but, currently, are pixels each displaying a color corresponding to a slightly whitened black-color gray-scale level, compared with the desired black-color gray-scale level, because of influences from surrounding white-color pixels. As a result, each of the pixels k has a gray-scale level different from that of each of pixels m, which is located inside the character "H" with no influence from surrounding pixels, and which displays a color corresponding to the desired black-color gray-scale level.

In step SA7, it is determined whether the second image data is stored in the frame memory 110, or not. If it is determined that the second image data is stored in the frame memory 110, the process flow proceeds to step SA8. Otherwise, this updating process is terminated.

In step SA8, the second image data is written into the display unit 10. As a result of this operation, as shown in FIG. 6D, the character "H" formed of pixels which are included in the entire screen of the display unit, and which have been updated to respective desired gray-scale levels, can be obtained. In other words, it is possible to display the character "H" originally defined by the first image data.

This is because image data shown in FIG. 6C is overwritten with the second image data resulting from extracting image data as image data corresponding to the first contour pixels, the image data corresponding to white-color pixels j each displaying faint gray color and black-color pixels k each displaying slightly whitened black color.

In addition, in FIG. 6C, examples of the pixels i, j, k and m are shown by respective groups of two pixels pointed by corresponding arrows, but all of pixels represented by the same color are categorized into the same kind. In other words, pixels other than the pixels pointed by the arrows are also categorized into any one of kinds of the pixels i, j, k and m.

Figure 7:
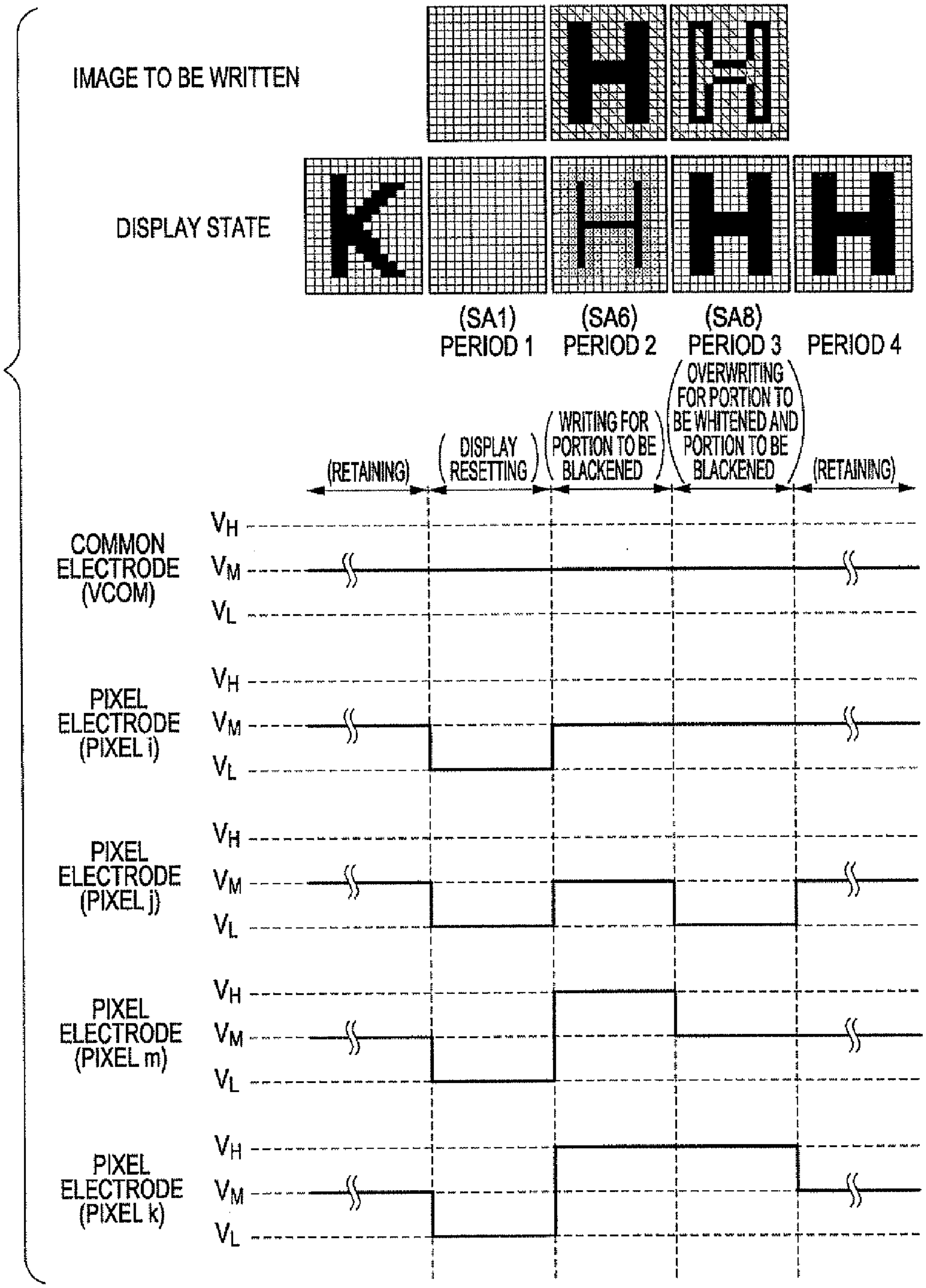
FIG. 7 is a timing chart illustrating waveforms of driving voltages according to an embodiment 1 of the invention.

FIG. 7 is a timing chart illustrating waveforms of driving voltages in the above-described driving method.

Here, driving electric potentials (voltages) supplied to respective electrodes in the driving method according to this embodiment will be described with reference to FIG. 7. In addition, in the upper area of FIG. 7, image data to be written and a display state in each of steps are shown. In addition, since the display states are the same as those shown in FIGS. 6A to 6D, here, the display states are omitted from description.

In this embodiment, descriptions will be made on the assumption that each electrode is supplied with an electric potential having three electric-potential levels. In this preferred example, when an electrophoretic display apparatus according to this embodiment is driven, each pixel is supplied with the high electric potential $V_H$ (15V), the middle electric potential $V_M$ (0V=GND) or the low electric potential $V_L$ (−15V). Further, descriptions will be made on the assumption that the electric potential of the common electrode (VCOM) is constantly equal to the middle electric potential $V_M$ (0V).

As shown in the timing chart of FIG. 7, this driving method is divided into four periods of time (periods 1 to 4).

During the period 1, as having been described in step SA1 (FIG. 5), resetting the display unit 10 is performed. At this timing, all the pixels (electrodes) included in the display unit 10 are supplied with the electric potential $V_L$. As a result of this operation, electric-potential differences between the common electrode (VCOM) and all the pixel electrodes arise, so that the entire screen of the display unit 10 are reset to white color.

During the period 2, as having been described in step SA6, the first image data corresponding to an image to be subsequently displayed is written into the display unit 10. At this timing, pixel electrodes corresponding to the white-color pixels i and j (FIG. 6C) in the first image data are supplied with electric potential $V_M$. Further, pixel electrodes corresponding to the black-color pixels m and k are supplied with the electric potential $V_H$.

As a result of this operation, regarding the white-color pixels i and j, no electric-potential difference arises between any one of the pixel electrodes and the common electrode do not arise, so that display states of the corresponding pixels do not vary from the white-color state. In contrast, regarding the black-color pixels m and k, an electric-potential difference arises between any one of the pixel electrodes and the common electrode, so that display states of the corresponding pixels vary from the white-color state to the black-color state.

During the period 3, as having been described in step SA8, the first contour pixels are overwritten with the second image data. In this case, the white-color pixels i and the black-color pixels m, which are not affected by surrounding pixels, are supplied with the electric potential $V_M$. In addition, the white-color pixels i and the black-color pixels m may be supplied with no electric potential, that is, may be in a floating condition. Further, regarding pixels affected by surrounding pixels, the white-color pixels j are supplied with electric potential $V_L$, and the black-color pixels k are supplied with electric potential $V_H$.

As a result of this operation, regarding the white-color pixels i and the black-color pixels m, no electric-potential difference arises between any one of the pixel electrodes and the common electrode, so that the current display state is retained. In contrast, regarding the white-color pixels j forming the first contour pixels and the black-color pixels k, an electric-potential difference arises between any one of the pixel electrodes and the common electrode, so that the white-color pixels j display further whitened color, and the black-color pixels k display further blackened color. In this manner, as a result, desired gray-scale levels are obtained all over the screen of the display unit 10.

The period 4 is a period of time during which the image corresponding to the image data having been written during the period 3 is retained. The display unit 10 is a memory-type display unit, and thus, is capable of retaining a displayed image even though no electric potential is supplied. Because of this characteristic, by causing all the pixel electrodes to be supplied with the electric potential $V_M$ so that no electric-potential difference arises between any one of the pixel electrodes and the common electrode, electric power consumption in a standby mode is reduced as much as possible. Alternatively, all the pixels may be caused to be supplied with no electric potential so that all the pixels can be in a floating condition.

As have been described hereinbefore, the electrophoretic display apparatus 100 (the driving method therefor) according to this embodiment can bring the following advantages.

Referring to FIG. 6D which is a diagram illustrating an example of an image resulting from updating an original image by employing the driving method according to this embodiment, it can be understood that desired gray-scale levels have been obtained all over the screen of the display unit 10. In other words, it is possible to display an image in accordance with gray-scale levels defined by image signals (i.e., the first image data).

This is because gray-scale levels of the pixels can be close to corresponding desired gray-scale levels thereof by performing an additional writing process on the pixels j and k (the first contour pixels), for which, as shown in FIG. 6C, desired gray-scale levels have not been obtained because of surrounding pixels. In other words, in step SA8, overwriting image data resulting from writing the first image data with the second image data causes the white-color pixels j to display further whitened color, and causes the black-color pixels k to display further blackened color, and as a result, can bring the desired gray-scale levels all over the screen of the display unit 10.

Thus, according to this embodiment, it is possible to achieve desired image quality.

Accordingly, it is possible to provide a control circuit and the electrophoretic display apparatus 100 which enable achievement of desired image quality.

Embodiment 2

FIGS. 8A to 10D are diagrams illustrating a driving method for driving an electrophoretic display apparatus, according to this embodiment 2. Hereinafter, a driving method according to this embodiment 2 will be described with reference to these figures. In addition, since the configuration of an electrophoretic display apparatus according to this embodiment 2 is the same as that of the electrophoretic display apparatus 100 according to the embodiment 1, the same configuration components and the same driving processes in this embodiment 2 as those in the embodiment 1 will be denoted by the same numbers as those of the embodiment 1, and duplicated descriptions will be omitted.

A difference between processes according to the embodiment 1 and those according to this second embodiment 2 is that, in the embodiment 1, the second image data resulting from extracting image data corresponding to the first contour pixels extracted from the first image data are additionally written; while, in this embodiment 2, third image data resulting from extracting image data corresponding to second contour pixels from the first image data is additionally written. That is, it is a difference from processes according to the embodiment 1 that, according to this embodiment 2, image data resulting from writing the first image data is overwritten with image data corresponding to the second contour pixels which are different from the first contour pixels.

Figure 8A:
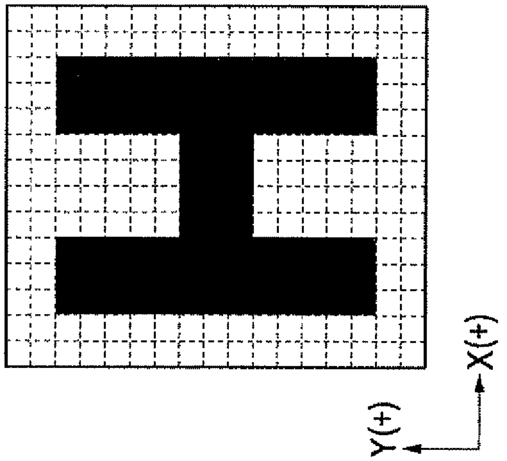
FIG. 8A is a diagram illustrating an example of first image data according to an embodiment 2 of the invention.
Figure 8B:
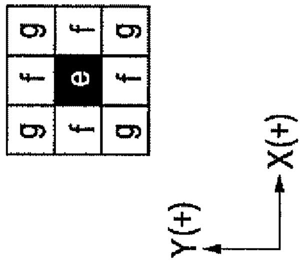
FIG. 8B is a diagram illustrating a second contour pixel according to an embodiment 2 of the invention.
Figure 8C:
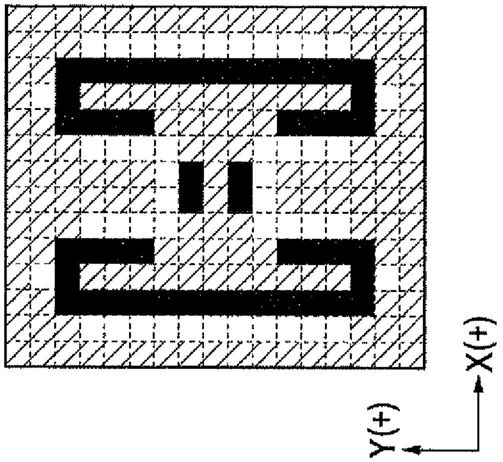
FIG. 8C is a diagram illustrating an example of third image data corresponding to the first image data, according to an embodiment 2 of the invention.

FIG. 8A is a diagram illustrating an example of first image data, and FIG. 8B is a diagram illustrating a second contour pixel. These figures are the same as FIGS. 4A and 4B. FIG. 8C is a diagram illustrating an example of third image data, and corresponds to FIG. 4C.

First, the second contour pixel and the third image data will be described with reference to FIGS. 8A to 8C.

An example of the first image data is shown in FIG. 8A. The first image data is the same as that shown in FIG. 4A, and therefore, is here omitted from descriptions.

The second contour pixel will be described by employing a pixel e located at the center of image data of 3×3 dots shown in FIG. 8B. The pixel e is determined to be the second contour pixel, in the case where, among eight pixels surrounding the pixel e, and consisting of four pixels f and four pixels g, at least three pixels have corresponding gray-scale levels each being different from that of the pixel e.

Namely, differing from the first contour pixel which is defined by relations with four pixels f which are located in the above-side, below-side, left-side and right-side directions relative to the pixel e, respectively, the second contour pixel has relations with the four pixels g located oblique to the pixel e, in addition to the four pixels f which are located in the above-side, below-side, left-side and right-side directions relative to the pixel e, respectively.

FIG. 8C shows the third image data resulting from extracting image data corresponding to the second contour pixels included in the first image data shown in FIG. 8A. It can be easily understood by comparing the third image data shown in FIG. 8C with the first image data shown in FIG. 4C that extracted pixels in the case of the second contour pixel are slightly different from those in the case of the first contour pixel.

For example, in the case of FIG. 8B, the pixel e is a black-color pixel; all of four pixels f, which are located adjacent to the pixel e and which are located in the above-side, below-side, left-side and right-side directions relative to the pixel e, respectively, are white-color pixels; and further, all of four pixels g located oblique to the pixel e are also white-color pixels, so that the pixel e is a black-color second contour pixel. In other words, among eight pixels, consisting of the four pixels f and the four pixels g, and surrounding the black-color pixel e, at least three pixels have corresponding white-color pixels each being different from that of the pixel e, and thus, the pixel e corresponds to the black-color second contour pixel.

Let us return to FIG. 8C.

In FIG. 8C, black-color pixels along the outline (contour) of the character “H” and white-color pixels located immediately outside the black-color pixels constitute the second contour pixels. The pixels shown by hatching do not correspond to the second contour pixels.

Specifically, each of the black-color pixels along the outline (contour) of the character "H" (here, which is called a pixel b) has at least three pixels, which have respective gray-scale levels each being different from that of the pixel b, among pixels surrounding the pixel b, and including pixels located oblique to the pixel b, and thus, the pixel b is the black-color second contour pixel.

Moreover, each of the white-color pixels located immediately outside the black-color second contour pixels (here, which is called a pixel w) has also at least three pixels, which have respective gray-levels each being different from that of the pixel w, among pixels surrounding the pixel w, and including pixels located oblique to the pixel w, and thus, the pixel w is the white-color second contour pixel.

Further, the black-color second contour pixels are supplied with driving electric potentials (voltages) for causing the black-color second contour pixels to display black color; while the white-color second contour pixels are supplied with electric potentials for causing the white-color second contour pixels to display white color, and the other pixels shown by hatching are supplied with the same electric potential as that of the common electrode.

The third image data denotes pieces of image data each defining one of these driving electric potentials allocated thereto. In addition, the third image data is created by using the frame memory 110 just like in the case of the second image data in the embodiment 1.

Figure 9:
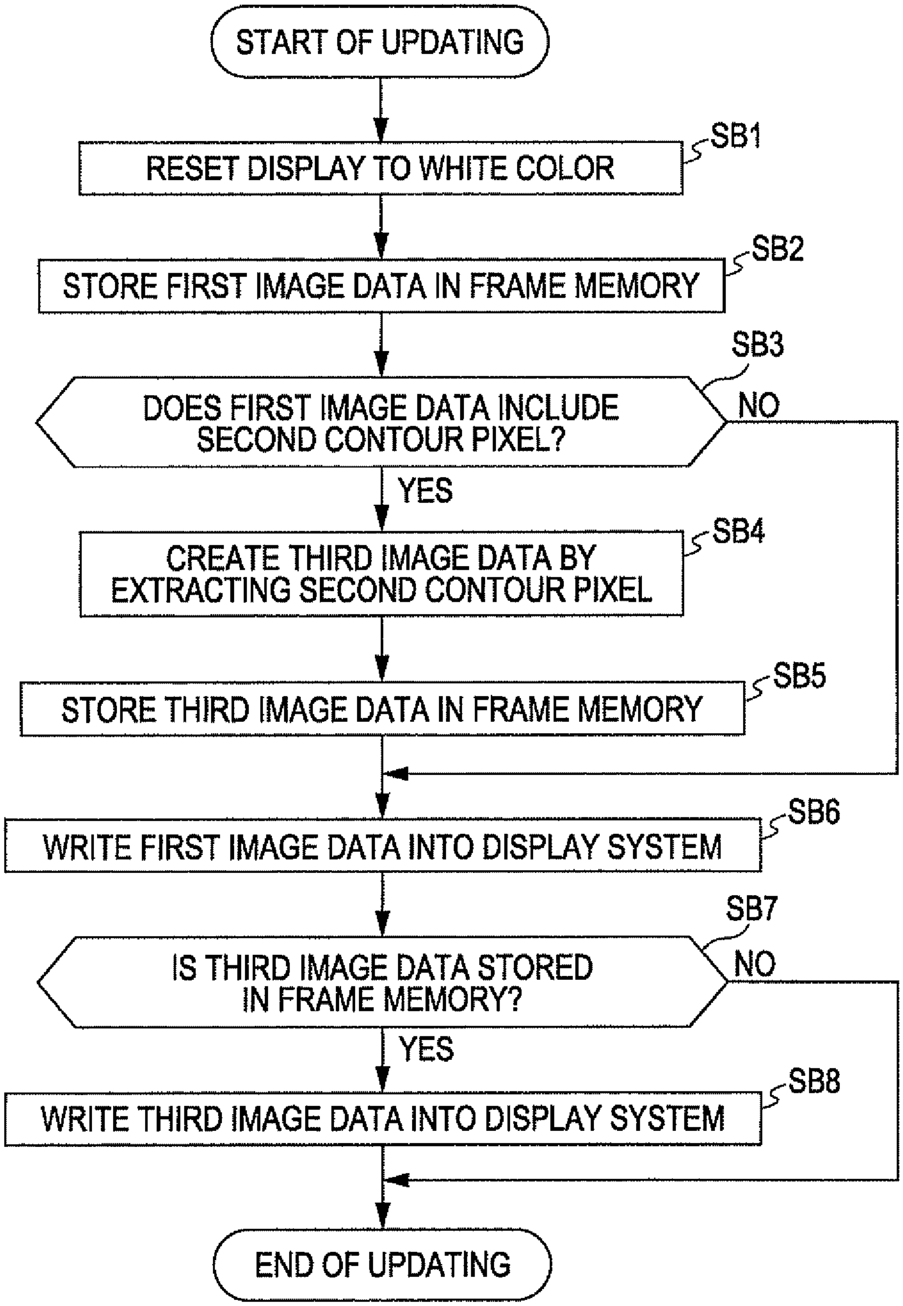
FIG. 9 is a flowchart illustrating a process flow of a driving method according to an embodiment 2 of the invention.

FIG. 9 is a flowchart illustrating a process flow of a driving method according to this embodiment. FIGS. 10A to 10D are state transition diagrams of an example of this embodiment.

Figures 10A, 10B, 10C, 10D:
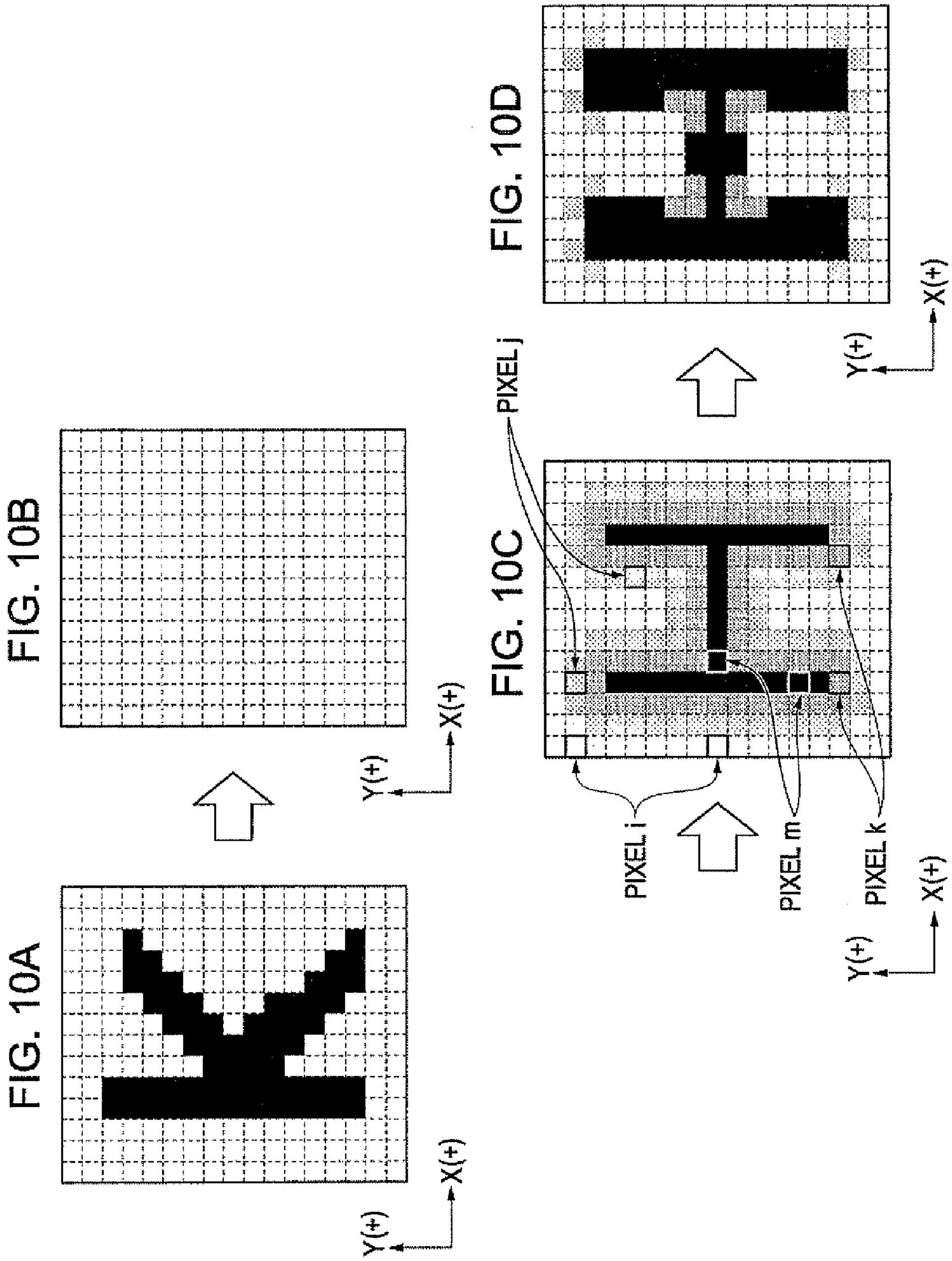
FIGS. 10A to 10D are state transition diagrams of an example of an image display, according to an embodiment 2 of the invention.

Here, a driving method for driving an electrophoretic display apparatus according to this embodiment will be described with reference to FIGS. 9 and 10A to 10D. Specifically, as an example, a driving method for updating a character "K" at an initial state, such as shown in FIG. 10A, to a character "H" shown in FIG. 10D will be described hereinafter.

In addition, the following processes are performed such that the control unit 60 shown in FIG. 2 performs control so as to cause individual units including the image signal processing unit 80 to perform relevant processes while executing corresponding driving programs stored in the storage unit 90.

In step SB1, a voltage supply process is performed so as to cause all pixels corresponding to the entire screen of the display unit 10 to display white color. In other words, all pixels corresponding to the entire screen are reset to white-color display states. As a result of this operation, an initial-state display "K" shown in FIG. 10A is reset, and the entire screen is in the white-color display state shown in FIG. 10B.

In step SB2, first image data corresponding to an image to be displayed on the screen of the display unit 10 is stored (written) in the frame memory 110.

In step SB3, it is determined whether pixels corresponding to the first image data include one or more second contour pixels, or not. Specifically, it is determined by evaluating pixels corresponding to the first image data, whether the pixels include one or more second contour pixels, or not, each of the second contour pixels being a certain pixel, which have at least three pixels, each having a gray-scale level different from that of the certain pixel, among eight pixels surrounding the certain pixel and including four pixels oblique to the certain pixel. If it is determined that the pixels include one or more second contour pixels, the process flow proceeds to step SB4. Otherwise, the process flow jumps to step SB6.

In step SB4, third image data resulting from extracting image data corresponding to the second contour pixels from the first image data is created.

In step SB5, the third image data is stored in the frame memory 110.

In step SB6, the first image data is written into the display unit 10. As a result of this process, as shown in FIG. 10C, image data corresponding to the character "H" is written, but regarding pixels each bordering pixels having different gray-scale levels, such as pixels each displaying faint gray color, corresponding desired gray-scale levels are not obtained because of influences from surrounding pixels.

For example, pixels j, which are located immediately outside black-color pixels forming the character "H", are pixels required to display a color corresponding to a white-color gray-scale level, but, currently, are pixels displaying a color corresponding to a slightly blackened white-color scale level (i.e., a faint-gray-color gray-scale level), compared with the desired white-color gray-scale level, because of influences from surrounding black-color pixels. As a result, the pixels j are now pixels having a gray-scale level different from that of the pixels i which are located immediately outside the pixels j, and which display a color corresponding to the desired white-color gray-scale level because of no influence from surrounding pixels.

Meanwhile, pixels k forming the contour of the character "H" are pixels required to display a color corresponding to the desired black-color gray-scale level, but, currently, are pixels displaying a color corresponding to a slightly whitened black-color gray-scale level, compared with the desired black-color gray-scale level, because of influences from surrounding white-color pixels. As a result, the pixels k are now pixels having a gray-scale level different from that of pixels m which are located inside the character "H", and which display a color corresponding to the desired black-color gray-scale level because of no influence from surrounding pixels.

In step SB7, it is determined whether the third image data is stored in the frame memory 110, or not. If it is determined that the third image data is stored in the frame memory 110, the process flow proceeds to step SB8. Otherwise, this updating process is terminated.

In step SB8, the third image data is written into the display unit 10. As a result of this operation, as shown in FIG. 10D, it is possible to display a character "H" having obtained gray-scale levels which are substantially the same as the desired gray-scale levels all over the screen of the display unit 10. In other words, it is possible to display a character "H" which is substantially the same as the desired character "H" defined by the first image data.

This is because image data shown in FIG. 10C is overwritten with the second image data resulting from extracting image data as image data corresponding to the second contour pixels, the image data corresponding to white-color pixels j each displaying faint gray color and most of black-color pixels k each displaying slightly whitened black color.

In addition, in FIG. 10C, examples of the pixels i, j, k and m are shown by respective groups of two pixels pointed by corresponding arrows, but all of pixels represented by the same color are categorized into the same kind. In other words, pixels other than the pixels pointed by the arrows are also categorized into any one of kinds of the pixels i, j, k and m.

Figure 11C:
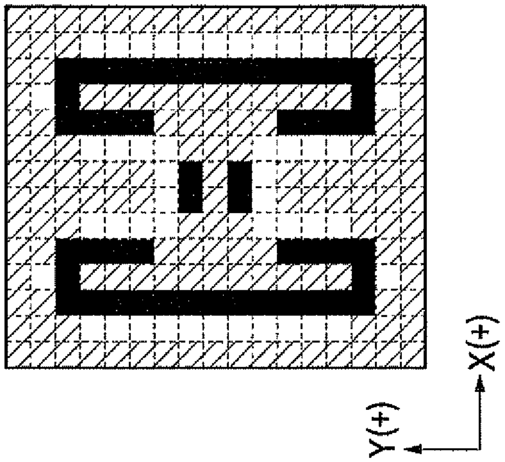
FIG. 11C is a diagram illustrating third image data according to an embodiment 2 of the invention.
Figure 11B:
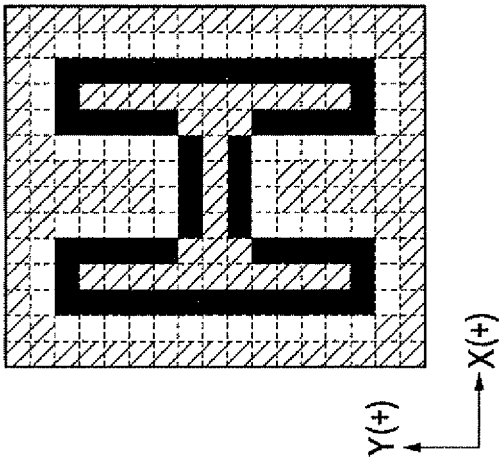
FIG. 11B is a diagram illustrating second image data according to an embodiment 1 of the invention.
Figure 11A:
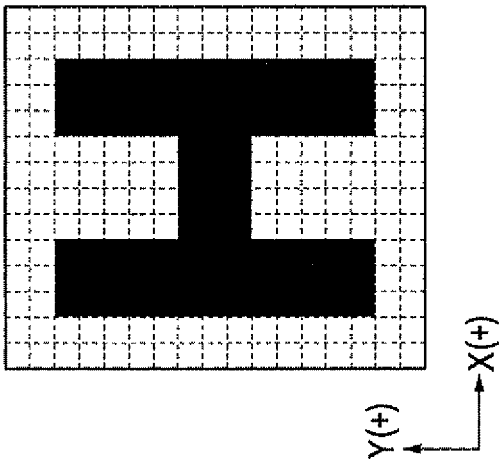
FIG. 11A is a diagram illustrating first image data according to an embodiment 1 and an embodiment 2 of the invention.

FIGS. 11A to 11C are diagrams used for descriptions of a comparison between the second contour pixels and the first contour pixels. Specifically, FIG. 11A is a diagram illustrating the first image data; FIG. 11B is a diagram illustrating the second image data (the first contour pixels); and FIG. 11C is a diagram illustrating the third image data (the second contour pixels).

A pixel p is extracted as the second contour pixel shown in FIG. 11C, not when at least one of pixels adjacent to the pixel p has been determined to be a pixel having a gray-scale level different from that of the pixel p, but when at least three ones of pixels bordering the pixel p, the pixels bordering the pixel p also including pixels located oblique to the pixel p, have been determined to be pixels each having a gray-scale level different from that of the pixel p. Thus, in general, the number of pixels extracted as the second contour pixel is smaller than the number of pixels extracted as the first contour pixel.

For example, comparing the first contour pixels shown in FIG. 11B and the second contour pixels shown in FIG. 11C, it can be understood that, regarding both black-color pixels and white-color pixels, the number of pixels having been extracted as the second contour pixel shown in FIG. 11C is smaller than the number of pixels having been extracted as the first contour pixel shown in FIG. 11B; and the number of pixels not corresponding to the second contour pixel shown by hatching in FIG. 11C is larger than the number of pixels not corresponding to the second contour pixel shown by hatching in FIG. 11B. Therefore, as a result, the number of pixels to be additionally supplied with voltages on the basis of the third image data is smaller than the number of pixels to be supplied with voltages on the basis of the second image data.

Further, driving electric potentials to be supplied to white-color pixels having been extracted as the second contour pixel are the same as those supplied to the pixel j shown in FIG. 7. Similarly, driving electric potentials to be supplied to black-color pixels having been extracted as the second contour pixel are the same as those supplied to the pixel k shown in FIG. 7.

Moreover, electric potentials supplied to other electrodes, as well as timings, are the same as or similar to those having been described with reference to FIG. 7.

As have been described hereinbefore, the driving method according to this embodiment can bring the following advantages, in addition to those brought by the driving method according to the embodiment 1.

A pixel p is not extracted as the second contour pixel in the case where at least one of pixels adjacent to the pixel p has been determined to be a pixel having a gray-scale level different from that of the pixel p, but the pixel p is extracted as the second contour pixel in the case where at least three of pixels bordering the pixel p, the pixels bordering the pixel p also including pixels located oblique to the pixel p, have been determined to be pixels each having a gray-scale level different from that of the pixel p. Therefor, the number of pixels to be additionally supplied with voltages on the basis of the third image data is smaller than the number of pixels to be supplied with voltages on the basis of the second image data. Namely, the number of pixels to be additionally supplied with voltages is smaller than that of the embodiment 1. Therefore, this reduction of the number of pixels to be additionally supplied with voltages enables reduction of power consumption.

In addition, as described above, the number of pixels extracted as the second contour pixel is smaller than the number of pixels extracted as the first contour pixel. For this reason, as shown in FIG. 10D, even after voltages have been additionally supplied on the basis of the third image data, some pixels each having a gray-scale level having not obtained a desired gray-scale level thereof still remain. However, it has been already found out through experiments having been performed by the inventors and the like that, in this case as well, desired gray-scale levels can be obtained all over the screen of the display unit. In other words, in this embodiment, image quality which is substantially the same as that resulting from overwriting with the first contour pixels can be obtained.

This reason is assumed to be as follows: electric fields are spread when voltages are additionally supplied, thereby causing surrounding pixels other than pixels targeted for corrections to be affected by correction voltages; and pixels having not obtained desired gray-scale levels have become more invisible in accordance with miniaturization of pixels.

Therefore, the driving method according to this embodiment enables achievement of desired image quality.

Accordingly, it is possible to provide a control circuit and an electrophoretic display apparatus which enable achievement of desired image quality.

Embodiment 3

Figure 12:
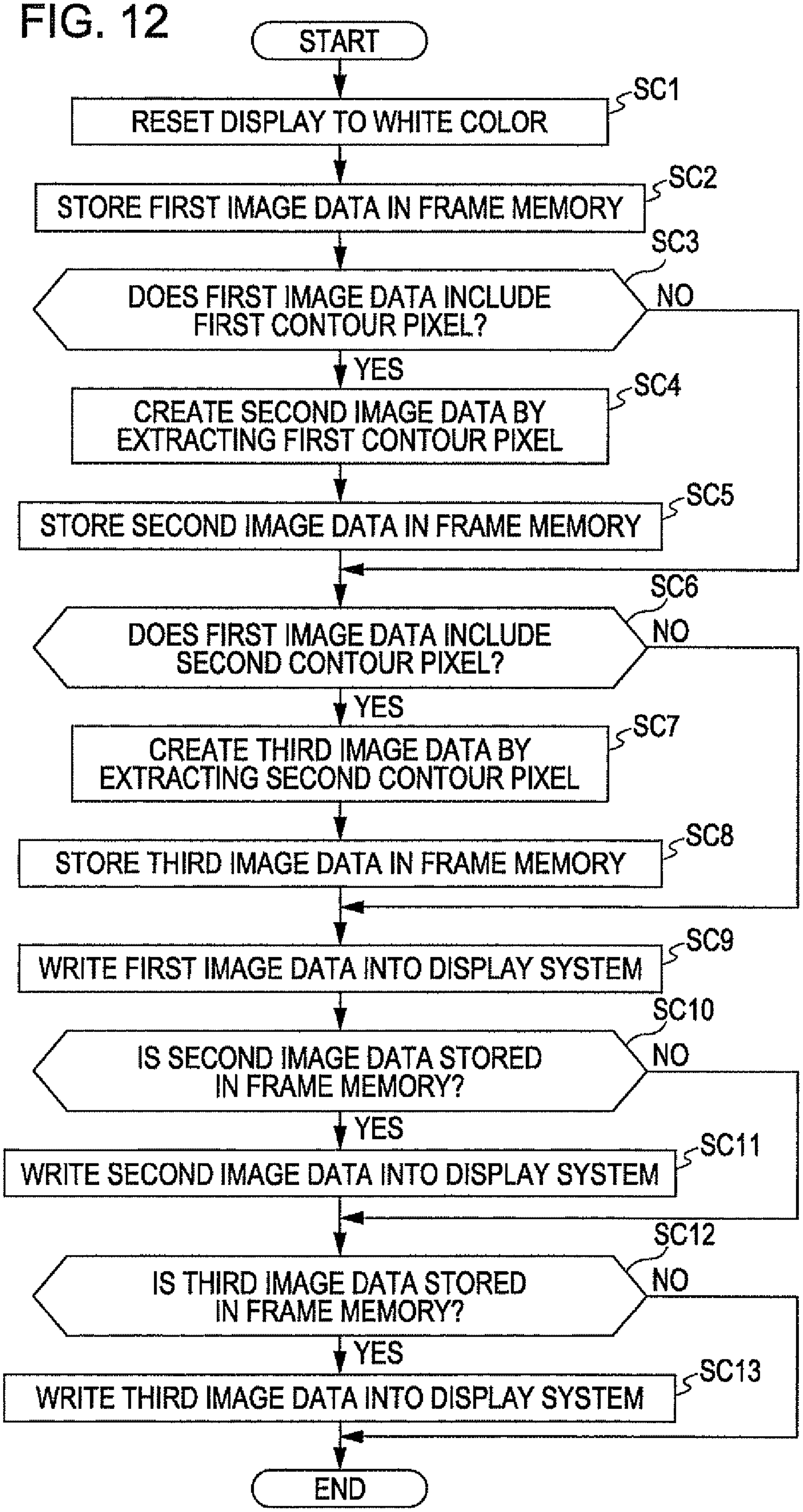
FIG. 12 is a flowchart illustrating a process flow of a driving method according to an embodiment 3 of the invention.

FIG. 12 is a flowchart illustrating a process flow of a driving method according to this embodiment 3, and corresponds to FIGS. 5 and 9. FIGS. 13A to 13E are state transition diagrams of an example of this embodiment 3, and correspond to FIGS. 6A to 6D and FIGS. 10A to 10D.

In addition, since the configuration of an electrophoretic display apparatus according to this embodiment 3 is the same as that of the electrophoretic display apparatus 100 according to the embodiment 1, the same configuration components and driving processes in this embodiment 3 as those in the embodiment 1 and 2 will be denoted by the same numbers as those of the embodiment 1 and 2, and duplicated descriptions will be omitted.

In the embodiment 1, an overwriting with the second image data is performed, and in the embodiment 2, an overwriting with the third image data is performed; in contrast, in this embodiment 3, a first overwriting with the second image data and a second overwriting process are performed. This third point is a difference from in the case of the first embodiment or in the case of the second embodiment.

A driving method according to this embodiment will be hereinafter described mainly with reference to FIG. 12 and supplementarily with reference to FIGS. 5 and 9.

First, processes in steps SC1 to SC5 are the same as those in steps SA1 to SA5 shown in FIG. 5. If one or more of the first contour pixels are extracted during the steps so far, the second image data is stored in the frame memory 110.

Subsequently, processes in steps SC6 to SC8 are the same as those in steps SB3 to SB5 shown in FIG. 9. If one or more of the second contour pixels are extracted during the steps so far, the third image data is stored in a memory area of the frame memory 110, which is different from a memory area in which the second image data is stored.

Figures 13A, 13B, 13C, 13D, 13E:
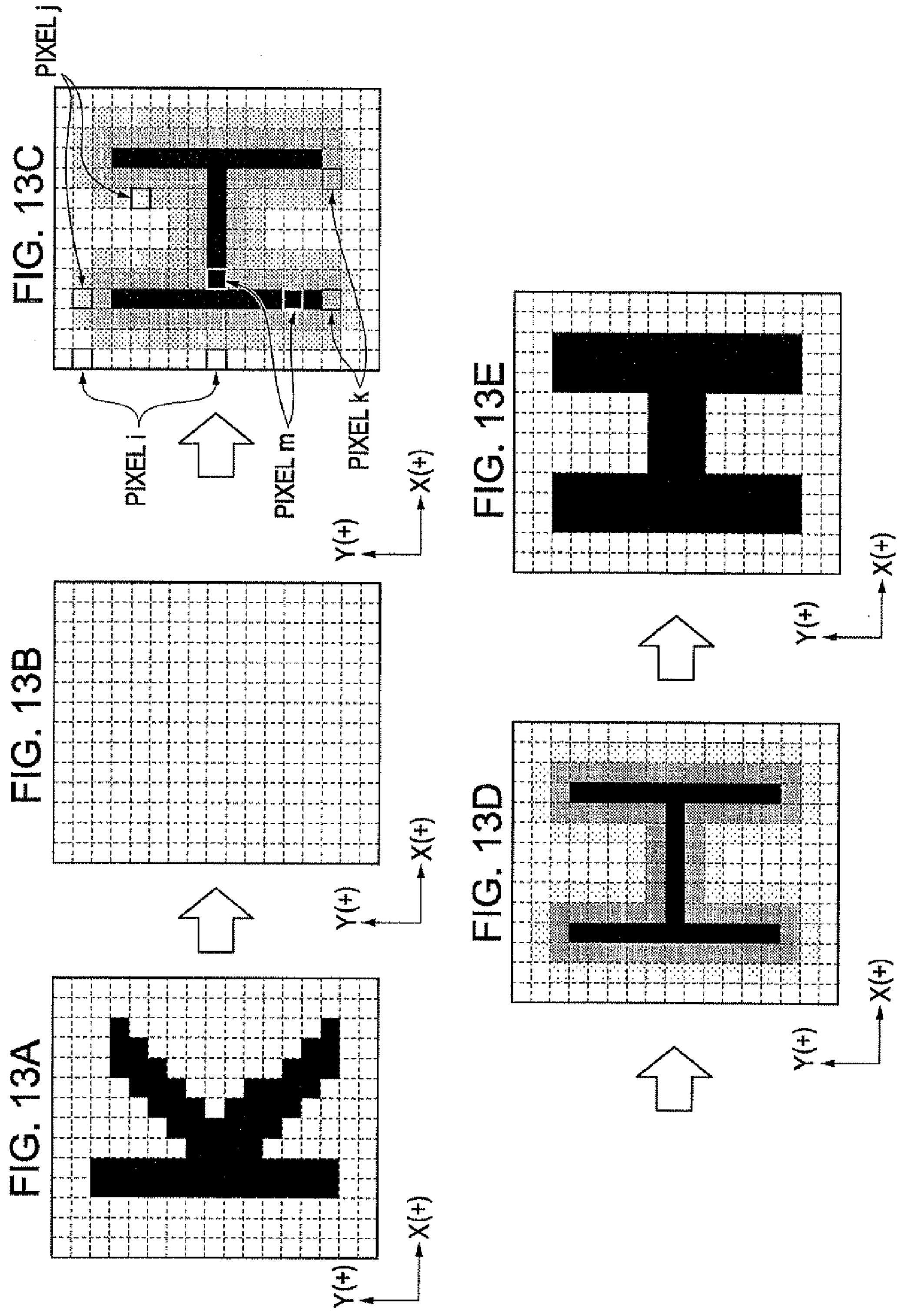
FIGS. 13A to 13E are state transition diagrams of an example of an image display, according to an embodiment 3 of the invention.

In step SC9, the first image data is written into the display unit 10. As a result of this operation, as shown in FIG. 13C, a character “H” is written. A condition at this stage, in which gray-scale levels of the white-color pixels j and the black-color pixels k do not have desired gray-scale levels thereof, is just like the condition having been described in the above-described embodiments.

In step SC10, it is determined whether the second image data is stored in the frame memory 110, or not. If it is determined that the second image data is stored in the frame memory 110, the process flow proceeds to step SC11. Otherwise, the process flow jumps to step SC12.

In step SC11, the second image data is written into the display unit 10. In addition, a period of time while relevant pixels are additionally supplied with electric potentials on the basis of the second image data is made shorter, compared in the case of the embodiment 1. A display condition at this stage is shown in FIG. 13D.

In step SC12, it is determined whether the third image data is stored in the frame memory 110, or not. If it is determined that the third image data is stored in the frame memory 110, the process flow proceeds to step SC13. Otherwise, this update processing is terminated.

In step SC13, the third image data is written into the display unit 10. As a result of this operation, as shown in FIG. 13E, it is possible to display a character "H" having obtained gray-scale levels which are substantially the same as the desired gray-scale levels all over the screen of the display unit 10. In other words, it is possible to display a character "H" which is substantially the same as the desired character "H" defined by the first image data.

As described above, the driving method according to this embodiment can bring the following advantages, in addition to those having been brought by the above-described embodiments.

In the driving method according to this embodiment, a first process of allowing individual pixels to be supplied with corresponding voltages on the basis of the second image data resulting from extracting image data corresponding to all of pixels which are likely to be affected by surrounding pixels, and a second process of allowing the pixels to be supplied with corresponding voltages on the basis of the third image data resulting from extracting image data corresponding to pixels which are highly likely to be affected by surrounding pixels, make it possible to perform weighting of gray-scale level corrections in accordance with degrees of influences from surrounding pixels, and thus, enable further improvement of display quality.

Therefore, the driving method according to this embodiment enables achievement of desired image quality.

Accordingly, it is possible to provide a control circuit and an electrophoretic display apparatus which enable achievement of desired image quality.

Moreover, as having been described above, the number of pixels extracted as the second contour pixels is smaller than that of pixels extracted as the first contour pixels.

Therefore, compared with a method in which, gray-scale levels are corrected twice, that is, an overwriting process is performed twice, by using only a voltage supply process based on the second image data, another method, in which a voltage supply process based on the second image data and a voltage supply process based on the third image data are performed, enables reduction of power consumption to a greater degree.

In addition, the invention is not limited to the above-described embodiments, and thus, various changes and modifications can be added to the above-described embodiments. Some modified examples will be described hereinafter.

Modified Example 1

Figure 14A:
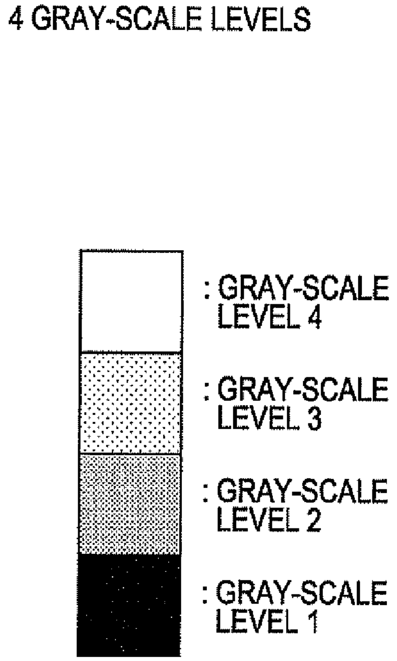
FIG. 14A is a diagram illustrating gray-scale levels according to a modified example 1 of the invention.
Figure 14B:
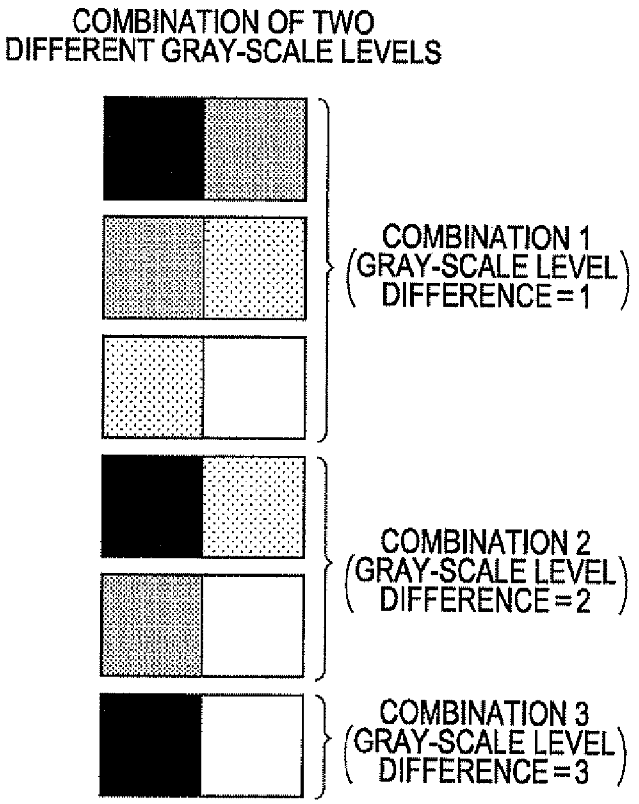
FIG. 14B is a diagram illustrating combinations of two different gray-scale levels according to a modified example 1 of the invention.
Figure 15A:
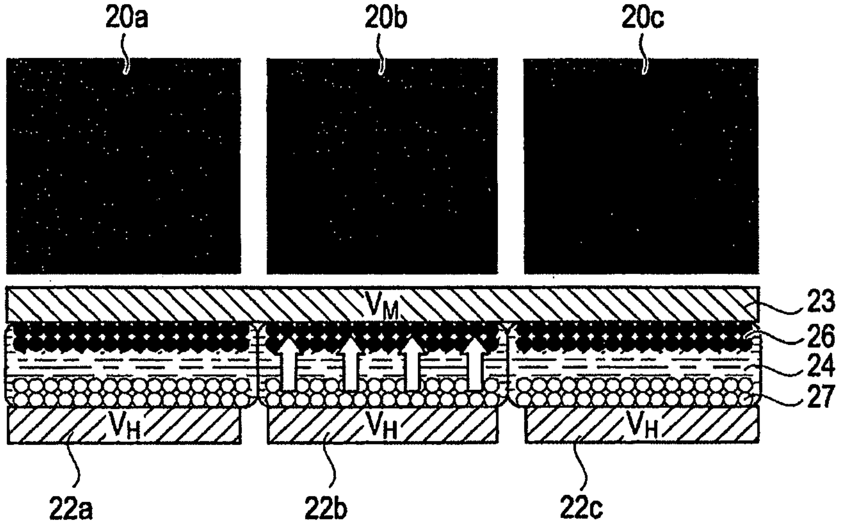
Related Art FIG. 15A
FIGS. 15A and 15B are diagrams illustrating a disadvantage of an existing driving method.
Figure 15B:
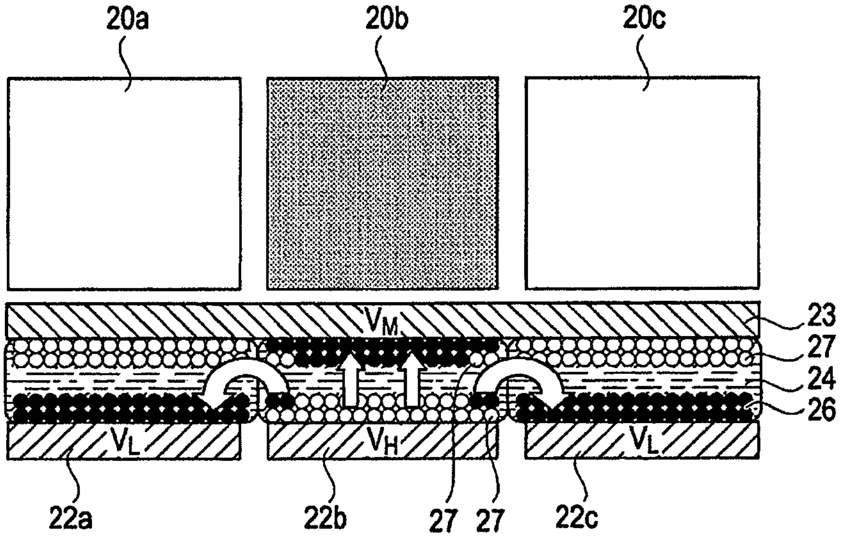
Related Art FIG. 15B

FIG. 14A is a diagram illustrating gray-scale levels according to this modified example 1, and FIG. 14B is a diagram illustrating combinations of two different gray-scale levels according to this modified example 1.

In the above-described embodiment 1, as shown in FIG. 4, the first image data has two gray-scale levels, and the number of blocks of the second image data corresponding to the first image data is one, but the invention is not limited to this condition.

Hereinafter, an electrophoretic display apparatus 100 according to this modified example 1 will be described. In addition, in this modified example 1, the same configuration components as those in the embodiment 1 are denoted by the same numbers as those of the embodiment 1, and duplicated descriptions will be omitted.

In this modified example 1, the first image data has a plurality of gray-scale levels. In this case, when a first pixel, which currently has a gray-scale level having not become a desired gray-scale level because of influences from pixels surrounding the first pixel, is supplied with a correction voltage for correcting the gray-scale level of the first pixel on the basis of a desired gray-scale level of a second pixel selected from among the pixels surrounding the first pixel, an amount of the to-be-supplied correction voltage varies depending on a difference between the desired gray-scale level of the first pixel and the desired gray-scale level of the second pixel.

Further, as a result of experiments carried out by the inventors and the like, it has been already figured out that an amount of a to-be-supplied correction voltage for correcting a gray-scale level of a first pixel can be determined on the basis of a second pixel which is one of pixels surrounding the first pixel, and which affects the first pixel to the greatest degree, that is, which has a desired gray-scale level having the largest difference with that of the first pixel.

Therefore, the kinds of amounts of to-be-supplied correction voltages exist with the number of combinations of any two different gray-scale levels selected from among the plurality of gray-scale levels. Therefore, in the case where the first image data has a plurality of gray-scale levels, by creating a plurality blocks of second image data in accordance with the respective kinds of amounts of to-be-supplied correction voltages, and performing correction-voltage supply processes in accordance with the respective blocks of second image data at plural times, it is possible to obtain desired gray-scale levels all over the display unit.

Here, assuming that the first image data has u gray-scale levels, a maximum number of the blocks of the second image data necessary for the corrections described above is equal to the number of combinations of any two different gray-scale levels selected from among the u gray-scale levels, that is, a number resulting from a calculation using a formula: ${}_uC_2$, i.e., u (u−1)/2. For example, in the case where, as shown in FIG. 14A, the first image data has four gray-scale levels, as shown in FIG. 14B, six combinations of two different gray-scale levels are derived, so that it is necessary to create six blocks of the second image data.

Meanwhile, in the case where each of combinations of two different gray-scale levels having the same level difference therebetween is supplied with the same amount of a to-be-supplied correction voltage, the number of the blocks of the second image data necessary for corrections is minimum. In this case, the number of the blocks of the second image data necessary for corrections is equal to the number of groups each including one or more combinations of two different gray-scale levels having the same level difference therebetween, and thus, when the first image data has u gray-scale levels, the number of the blocks of the second image data necessary for corrections is (u−1). For example, in FIG. 14B, it is necessary to create three blocks of the second image data, which result from totaling the number of blocks of the second image data in the case where a level difference between two different gray-scale levels included in each combination is one, the number of the blocks of the second image data in the case where a level difference between two different gray-scale levels included in each combination is two, and the number of the blocks of the second image data in the case where a level difference between two different gray-scale levels included in each combination is three.

As described hereinbefore, the driving method according to this modified example 1 can bring the following advantages, in addition to the advantages according to the embodiment 1.

Namely, with respect to pixels which correspond to image data having a plurality of gray-scale levels, and which have not become respective desired gray-scale levels because of influences from surrounding pixels, by performing additional correction-voltage supply processes at plural times in accordance with the number of combinations of any two different gray-scale levels selected from among the plurality of gray-scale levels, it is possible to allow gray-scale levels of individual pixels to be close to the respective desired gray-scale levels. Accordingly, it is possible to provide a control circuit and an electrophoretic display apparatus which enable achievement of high display quality.

Modified Example 2

It has been described in the above-described embodiments 1 to 3 that the second image data and the third image data are created in the frame memory 110 shown in FIG. 2, but the present invention is not limited to this configuration.

Hereinafter, the electrophoretic display apparatus 100 according to this modified example 2 will be described. In addition, the same configuration components in this modified example 2 as those in the above-described embodiments will be denoted by the same numbers as those of the above-described embodiments, and duplicated descriptions will be omitted.

In this modified example 2, the second image data and the third image data are created in the image signal supply circuit 130 which is located outside the electrophoretic display apparatus 100. The image signal supply circuit 130 is, for example, a personal computer (PC).

The second image data and the third image data having been created in the image signal supply circuit 130 are stored in the storage unit 90 via the control unit 60.

The first image data stored in the storage unit 90 is appended by information relating to addresses of areas where the second image data and the third image data associated with the first image data itself are stored. Further, when the first image data is stored in the frame memory 110, simultaneously, the associated second image data and the third image data are stored in the frame memory 110.

As described above, the electrophoretic display apparatus 100 according to this modified example 2 allows the image signal supply circuit 130 to create the second image data and the third image data in advance to make it unnecessary to cause the image signal processing unit 80 to create image data, and thus, enables reduction of a load of the image signal processing unit 80 to achieve high-speed display updating.

The entire disclosure of Japanese Patent Application No. 2010-238256, filed Oct. 25, 2010 is expressly incorporated by reference herein.

What is claimed is:

1. A driving method for driving an electrophoretic display apparatus, comprising:

writing first image data into a display unit provided with a plurality of pixels;

creating second image data including image data which corresponds to first contour pixels, and which is extracted from the first image data, each of the first contour pixels being a first pixel located adjacent to a second pixel having a gray-scale level different from a gray-scale level of the first pixel, the first pixel and the second pixel being included in the plurality of pixels; and writing the second image data into the display unit after the first image data.

2. The driving method for driving an electrophoretic display apparatus, according to claim 1, wherein, in the case where the first image data is image data having u gray-scale levels, the number of to-be-created blocks of the second image data is larger than or equal to (u−1) and smaller than or equal to u×(u−1)/2.

3. The driving method for driving an electrophoretic display apparatus, according to claim 2, wherein, in the case where the number of to-be-created blocks of the second image data is a plural number, the plurality of blocks of the second image data is written into the plurality of pixels included in the display unit on a block-by-block basis.

4. A control circuit being configured to carry out the driving method according to claim 1 to drive the display unit to perform displaying.

5. An electrophoretic display apparatus comprising the control circuit according to claim 4.

6. A driving method for driving an electrophoretic display apparatus, comprising:

writing first image data into a display unit provided with a plurality of pixels;

creating third image data including image data which corresponds to second contour pixels, and which is extracted from the first image data, each of the second contour pixels being a third pixel which is enclosed by eight of fourth pixels including at least three pixels each having a gray-scale level different from a gray-scale level of the third pixel, the third pixel and the fourth pixel being included in the plurality of pixels; and writing the third image data into the display unit.

7. The driving method for driving an electrophoretic display apparatus, according to claim 6, wherein, in the case where the first image data is image data having u gray-scale levels, the number of to-be-created blocks of the second image data is larger than or equal to (u−1) and smaller than or equal to u×(u−1)/2.

8. The driving method for driving an electrophoretic display apparatus, according to claim 7, wherein, in the case where the number of to-be-created blocks of the second image data is a plural number, the plurality of blocks of the second image data is written into the plurality of pixels included in the display unit on a block-by-block basis.

9. A control circuit being configured to carry out the driving method according to claim 6 to drive the display unit to perform displaying.

10. An electrophoretic display apparatus comprising the control circuit according to claim 9.

11. A driving method for driving an electrophoretic display apparatus, comprising:

writing first image data into a display unit provided with a plurality of pixels;

creating second image data including image data which corresponds to first contour pixels, and which is extracted from the first image data, each of the first contour pixels being a first pixel located adjacent to a second pixel having a gray-scale level different from a gray-scale level of the first pixel, the first pixel and the second pixel being included in the plurality of pixels;

creating third image data including image data which corresponds to second contour pixels, and which is extracted from the first image data, each of the second contour pixels being a third pixel which is enclosed by eight of fourth pixels including at least three pixels each having a gray-scale level different from a gray-scale level of the third pixel, the third pixel and the fourth pixel being included in the plurality of pixels;

writing the second image data into the display unit; and writing the third image data into the display unit.

12. The driving method for driving an electrophoretic display apparatus, according to claim 11, wherein, in the case where the first image data is image data having u gray-scale levels, the number of to-be-created blocks of the second image data is larger than or equal to (u−1) and smaller than or equal to u×(u−1)/2.

13. The driving method for driving an electrophoretic display apparatus, according to claim 12, wherein, in the case where the number of to-be-created blocks of the second image data is a plural number, the plurality of blocks of the second image data is written into the plurality of pixels included in the display unit on a block-by-block basis.

14. A control circuit being configured to carry out the driving method according to claim 11 to drive the display unit to perform displaying.

15. An electrophoretic display apparatus comprising the control circuit according to claim 14.

* * * * *